(12) United States Patent
Resch et al.

(10) Patent No.: US 8,914,609 B2
(45) Date of Patent: *Dec. 16, 2014

(54) MODIFYING DATA STORAGE IN RESPONSE TO DETECTION OF A MEMORY SYSTEM IMBALANCE

(71) Applicant: Cleversafe, Inc., Chicago, IL (US)

(72) Inventors: Jason K. Resch, Chicago, IL (US); Gary W. Grube, Barrington Hills, IL (US); S. Christopher Gladwin, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/230,446

(22) Filed: Mar. 31, 2014

(65) Prior Publication Data

US 2014/0214909 A1  Jul. 31, 2014

Related U.S. Application Data

(63) Continuation of application No. 13/343,405, filed on Jan. 4, 2012, now Pat. No. 8,688,949.

(60) Provisional application No. 61/438,516, filed on Feb. 1, 2011.

(51) Int. Cl.
*G06F 12/00* (2006.01)
*G06F 17/30* (2006.01)

(52) U.S. Cl.
CPC .... *G06F 17/30091* (2013.01); *G06F 17/30138* (2013.01)

USPC .......... 711/202; 711/100; 711/154; 711/170; 711/205; 711/207; 711/221

(58) Field of Classification Search
None
See application file for complete search history.

(56) References Cited

U.S. PATENT DOCUMENTS 7,636,724 B2   12/2009  de la Torre et al.

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

*Primary Examiner* — Midys Rojas
(74) *Attorney, Agent, or Firm* — Garlick & Markison; Timothy W. Markison; Shayne X. Short

(57) ABSTRACT

A computing device includes an interface, memory, and a processing module. The memory stores a directory and inode tables. The directory stores a file identifier and a corresponding inumber for each file that is stored in storage units. An inode table stores an inumber, metadata, and a DSN address for each file stored in a corresponding storage unit. The processing module is operable to monitor, for each of the inode tables, utilization of the memory. The processing module is further operable to monitor, for each of the storage units, utilization of memory of the storage units. The processing module is further operable to process, for the inode table and/or the corresponding storage unit, per inode table memory utilization data and per storage unit memory utilization data to adjust memory utilization of the inode table and/or memory utilization of the corresponding storage unit.

14 Claims, 16 Drawing Sheets

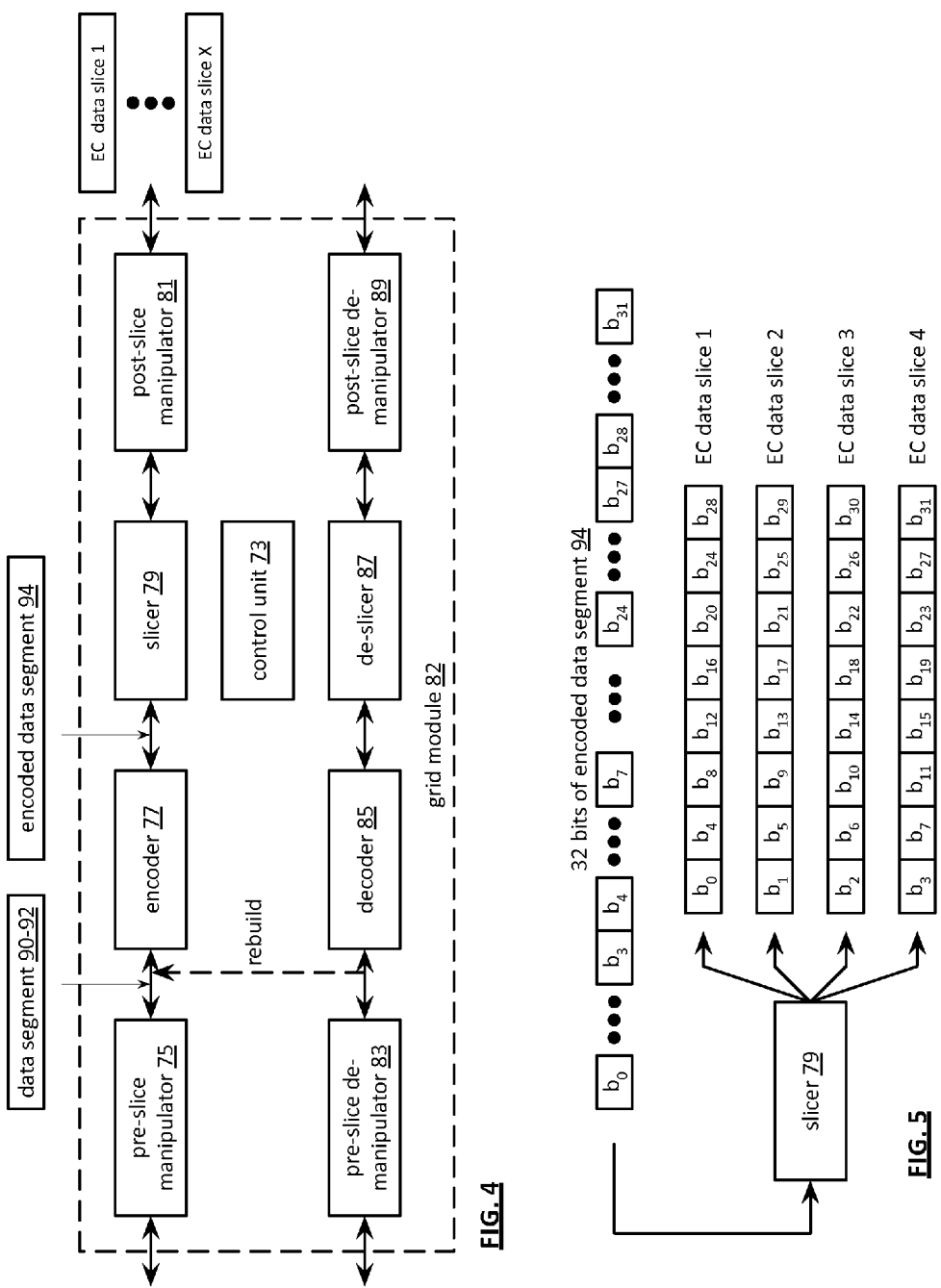

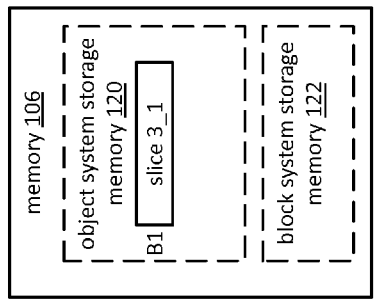
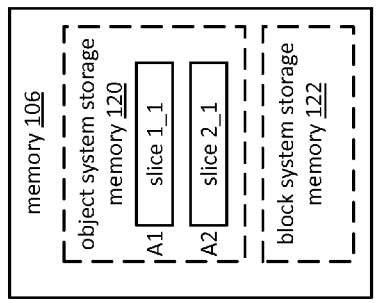
FIG. 6B
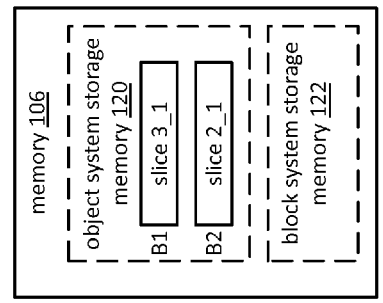
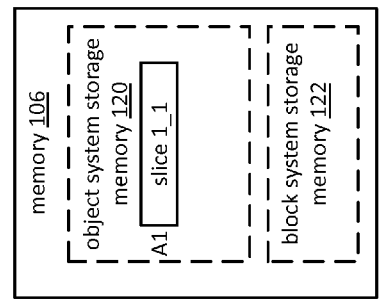
FIG. 6C

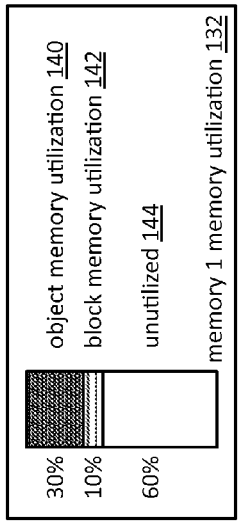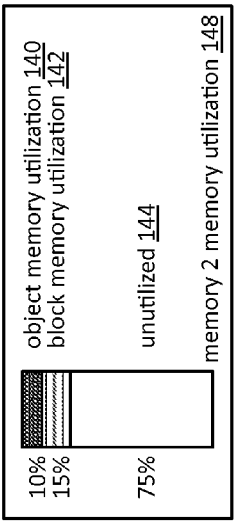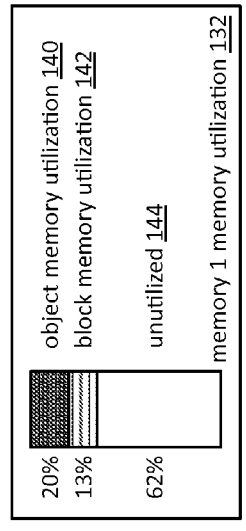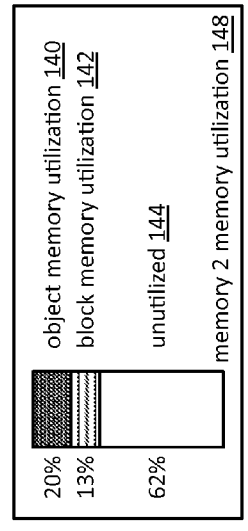
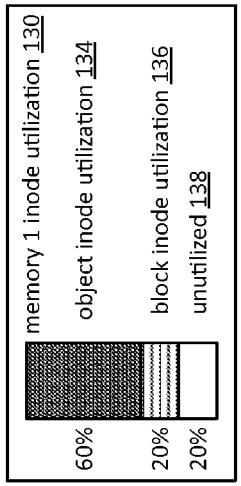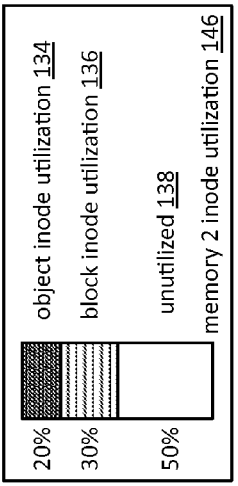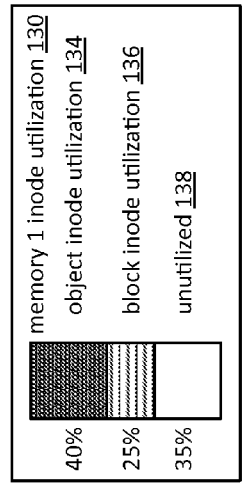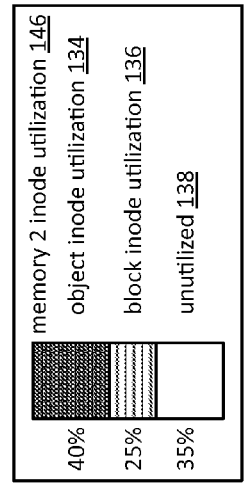
FIG. 7A  FIG. 7B  FIG. 7C  FIG. 7D

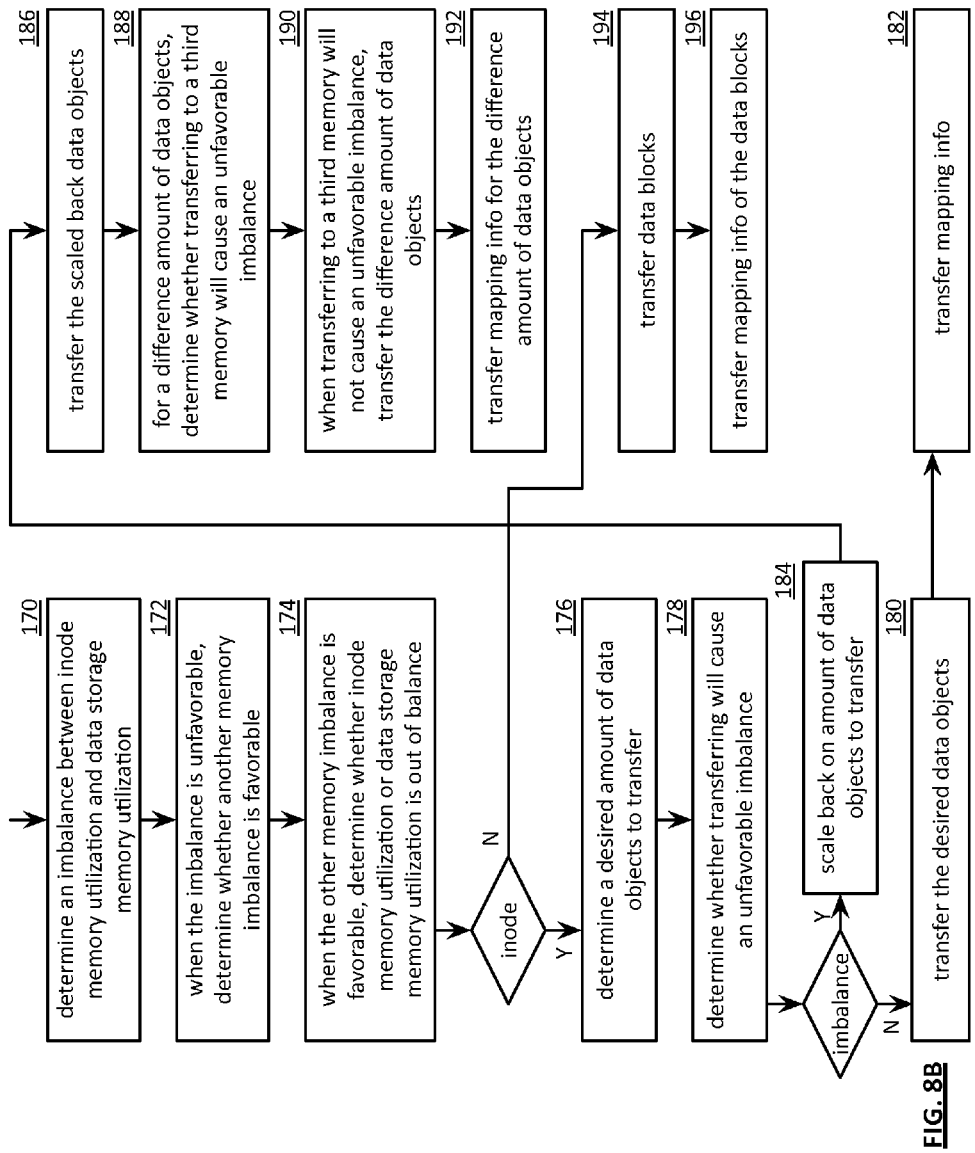

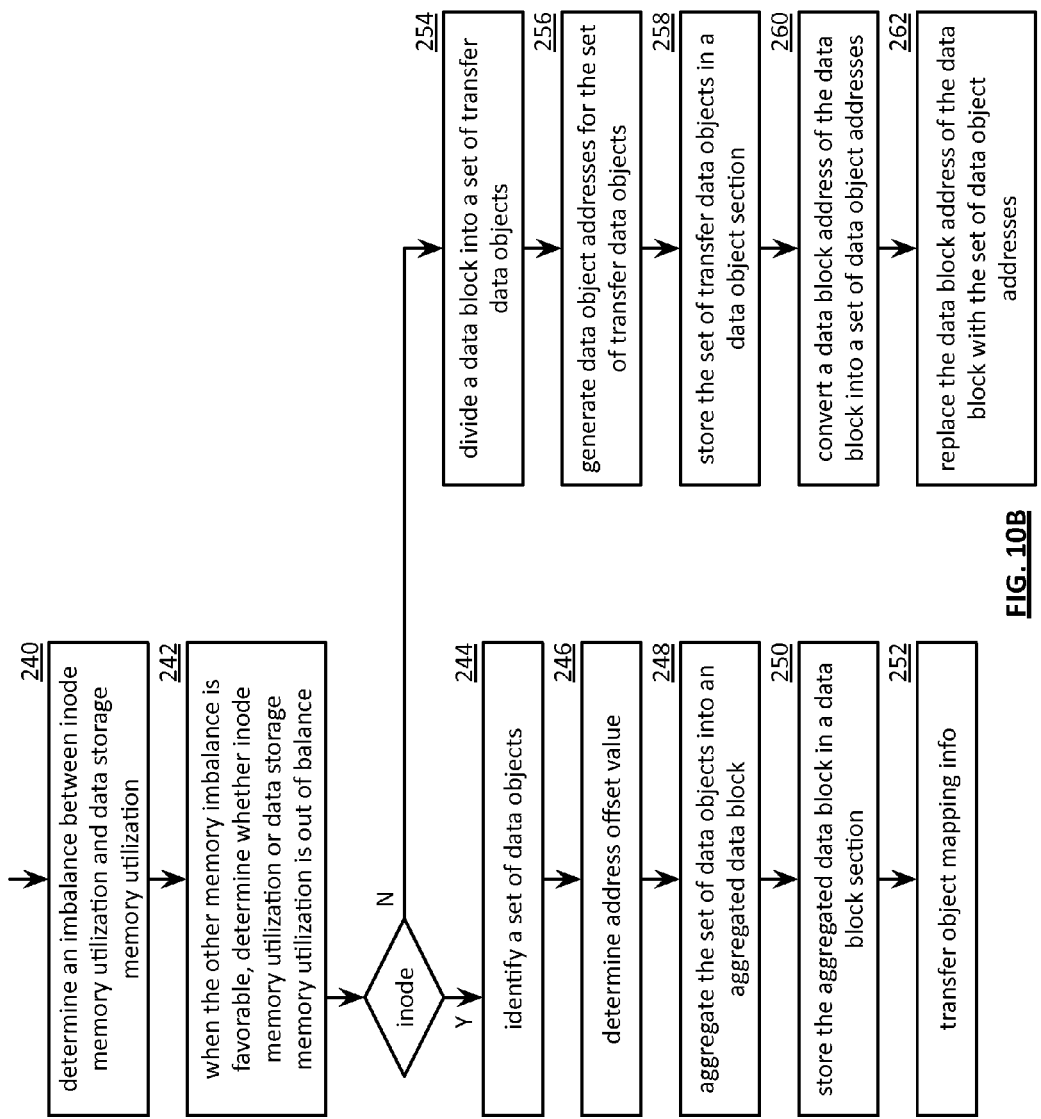

MODIFYING DATA STORAGE IN RESPONSE TO DETECTION OF A MEMORY SYSTEM IMBALANCE

CROSS REFERENCE TO RELATED PATENTS

The present U.S. Utility Patent Application claims priority pursuant to 35 U.S.C. §120 as a continuation of U.S. Utility application Ser. No. 13/343,405, entitled "MODIFYING DATA STORAGE IN RESPONSE TO DETECTION OF A MEMORY SYSTEM IMBALANCE", filed Jan. 4, 2012, issuing as U.S. Pat. No. 8,688,949, on Apr. 1, 2014, which claims priority pursuant to 35 U.S.C. §119(e) to U.S. Provisional Application No. 61/438,516, entitled "UNIFIED DISPERSED STORAGE", filed Feb. 1, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 6B is a diagram of another example embodiment of a DS unit memory structure in accordance with the invention;

FIG. 6C is a diagram of another example embodiment of a DS unit memory structure in accordance with the invention;

FIG. 7A is a diagram illustrating an example of memory resource utilization in accordance with invention;

FIG. 7B is a diagram illustrating another example of memory resource utilization in accordance with invention;

FIG. 7C is a diagram illustrating another example of memory resource utilization in accordance with invention;

FIG. 7D is a diagram illustrating another example of memory resource utilization in accordance with invention;

FIG. 8B is a flowchart illustrating an example of balancing memory resource utilization in accordance with the invention;

FIG. 10B is a flowchart illustrating an example of aggregating memory resources in accordance with the invention;

DETAILED DESCRIPTION OF THE INVENTION

Figure 1:
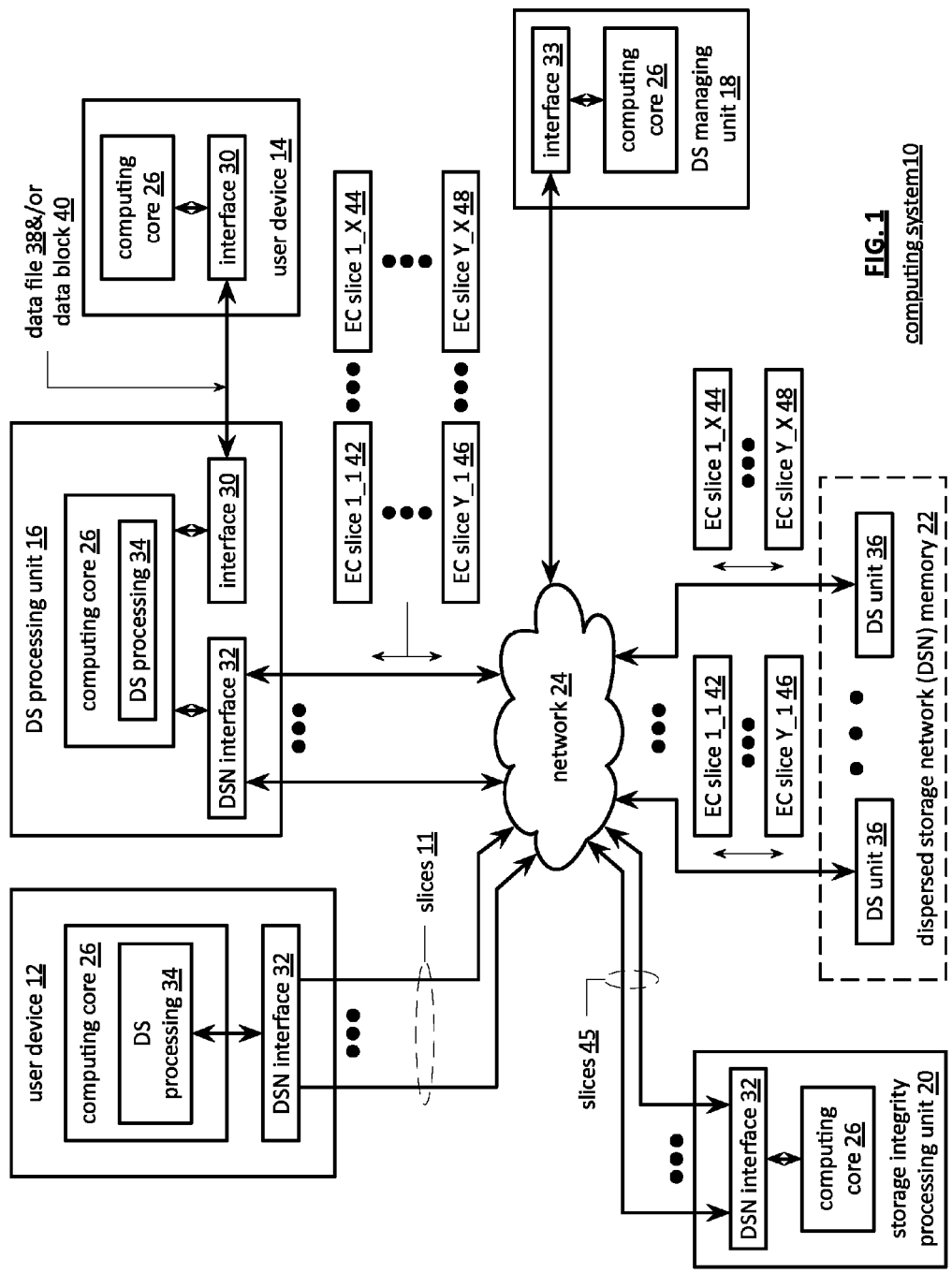
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^2$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
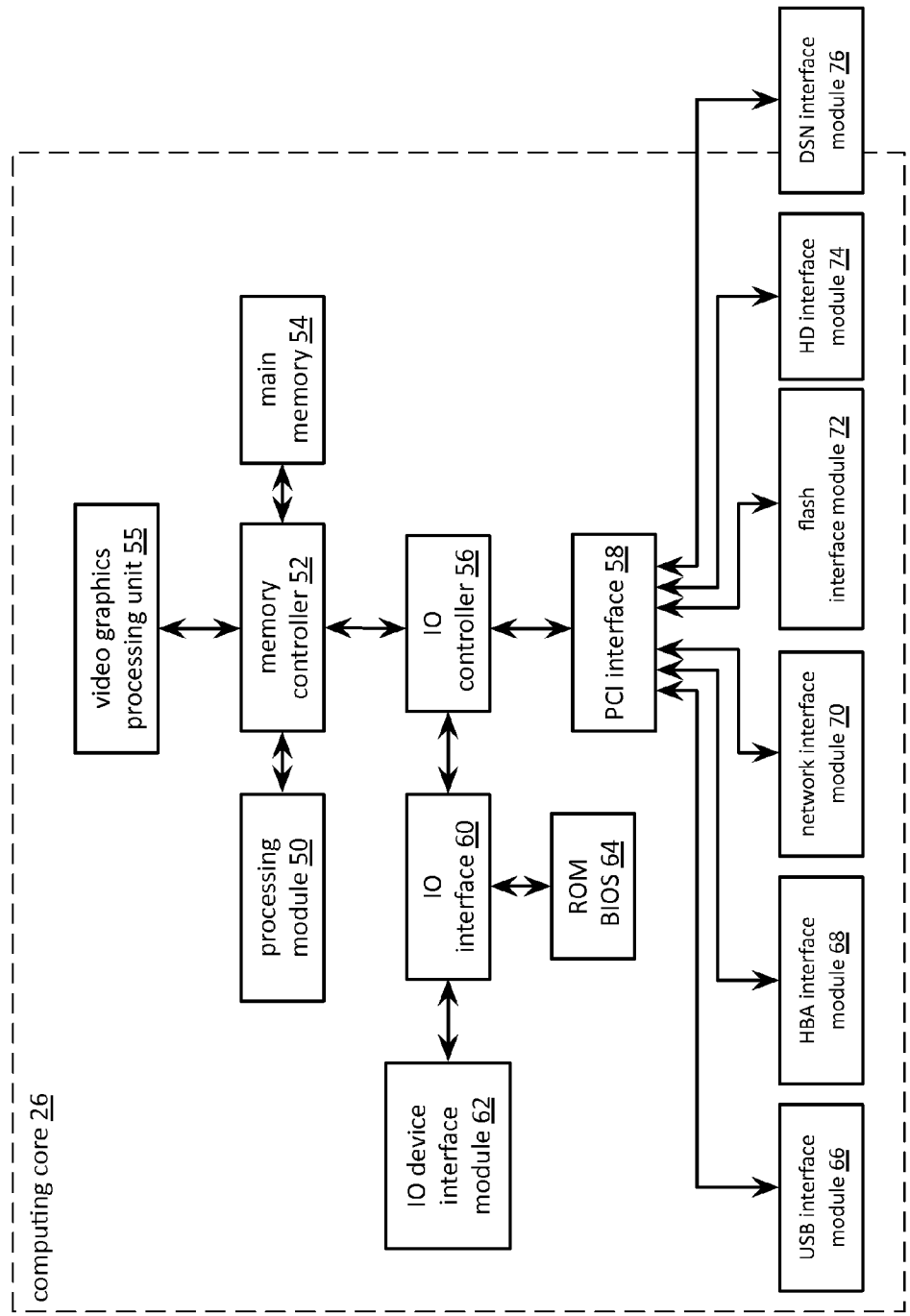
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the 10 device interface module 62 and/or the memory interface modules may be collectively or individually referred to as IO ports.

Figure 3:
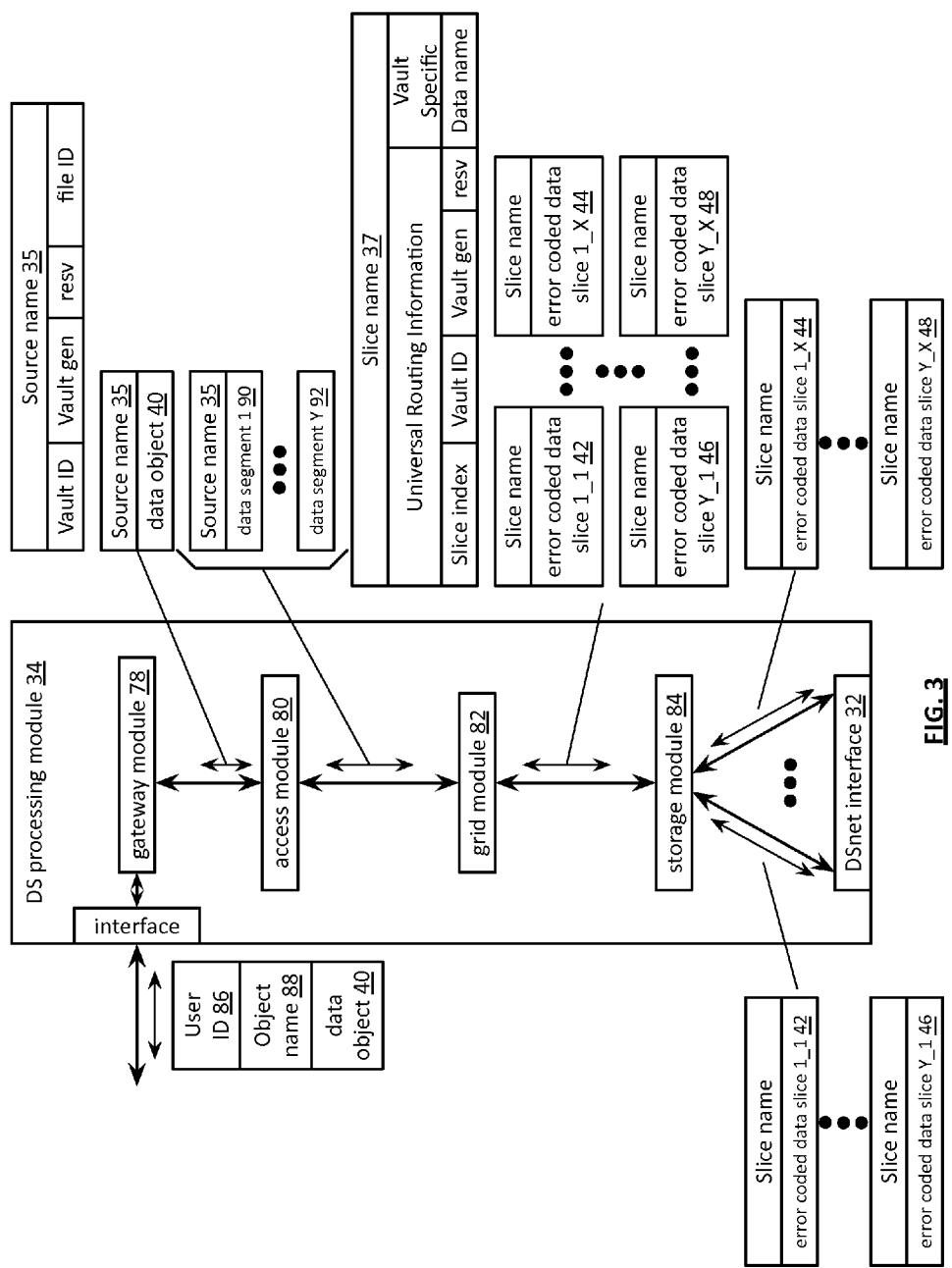
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
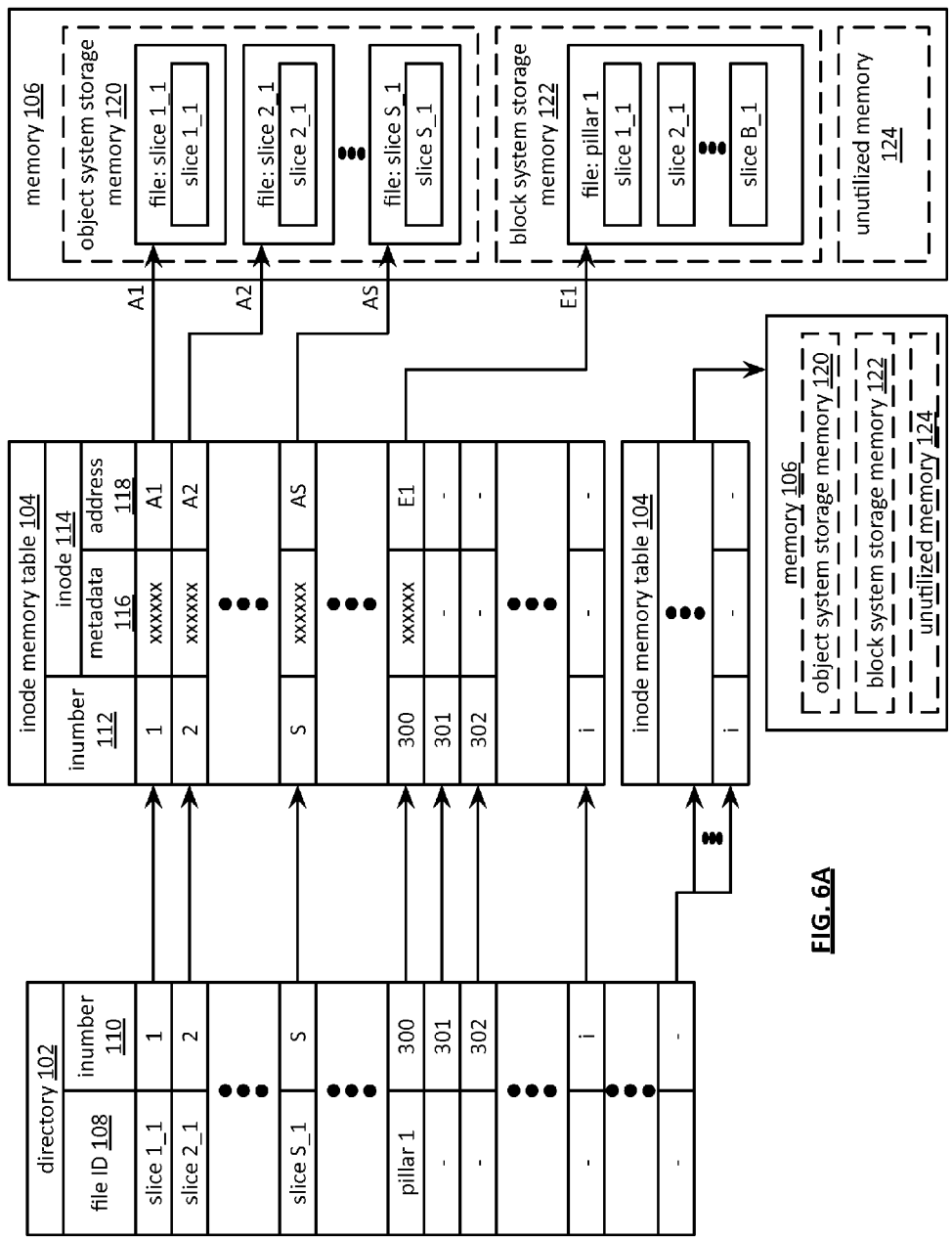
FIG. 6A is a diagram of an example embodiment of a dispersed storage (DS) unit memory structure in accordance with the invention.

FIG. 6A is a diagram of an example embodiment of a dispersed storage (DS) unit memory structure that includes a directory 102, at least one inode table 104, and at least one memory 106. The directory 102 includes a file identifier (ID) field 108 and an inumber field 100 and. The file ID field 108 includes one or more file ID entries, wherein each file ID includes at least one of a source name, a slice name, a random file name, a predetermined file name, an object name, a block ID, a segment ID, and a pillar ID. The file ID references at least one file stored as encoded data slices in the least one memory 106. For example, a file containing an encoded data slice of a first data segment and a first pillar is stored in memory 106 has a corresponding file ID of slice 1_1. As another example, a file containing an encoded data slice of a second data segment and a first pillar is stored in the memory 106 that has a corresponding file ID of slice 2_1. As yet another example, a file containing an encoded data slice of a last data segment and a first pillar is stored in the memory 106 that has a corresponding file ID of slice S_1. As a further example, a file containing a plurality of encoded data slices of a common pillar ID is stored in the memory 106 that has a corresponding file ID of pillar 1.

The inumber field 110 includes an integer number inumber entry utilized to index into the inode table 104 for a corresponding file of the file ID field 108. The inumber field 100 and includes a plurality of inumber entries (e.g., inumbers 1-i) corresponding to a plurality of files stored in the memory 106. For example, the file stored in memory 106 associated with the file ID slice 2_1 utilizes an inumber of 2. As another example, the file stored in memory 106 associated with the file ID pillar 1 utilizes an inumber of 300. As yet another example, no file is associated with inumber 301 (e.g., an available inumber).

The inode memory table 104 includes an inumber field 112 and an inode field 114. The inode memory table 104 may be implemented as a physical memory device and/or as a virtual memory module within one or more memory devices. The inode field 114 includes a metadata field 116 and an address field 118. The metadata field 116 includes one or more metadata entries (e.g., corresponding to a plurality of files stored in the memory) including at least one of a file size indicator, a slice offset, an address offset, a slice offset list, a user ID, a group ID, a file type indicator, a source name, an object number, an access mode indicator, a modification limitation indicator, a use limitation indicator, a file modification timestamp, a last access time stamp, and an inode change time stamp. The address field 118 includes at least one address entry (e.g., corresponding to a plurality of files stored in the memory) including one or more of a memory ID, a physical memory address, a virtual memory address, a memory pointer, a memory block indicator, and a file address. For example, the file stored in memory associated with the file ID slice 2_1 is stored in the memory at address A2. As another example, the file stored in memory associated with file ID pillar 1 is stored in the memory at address E1.

The memory 106 includes one or more of an object system storage memory 120, a block system storage memory 122, and unutilized memory 124. The memory 106 may be implemented as one or more physical memory devices and/or as a virtual memory module within one or more memory devices. The memory of 106 is utilized to store files in accordance with a file system of the DS unit, wherein each file includes one or more encoded data slices. For example, one encoded data slice is stored per file in the object system storage memory 120 when storing encoded data slices of a data object. For instance, an encoded data slice with a slice ID of slice 1_1 is stored in a file with a file ID of slice 1_1 at address A1 of the object system storage memory 120. A memory of a second DS unit may be utilized to store encode data slices of pillar 2 when storing encoded data slices of a data object. As another example, a plurality of encode data slices is stored in one file in the block system storage memory 122 when storing encoded data slices of a common pillar of a common data block. For instance, a plurality of encoded data slices 1_1 through B_1 is stored in the file with the file ID of pillar 1 at address E1 of the block system storage memory 122. The memory of the second DS unit may be utilized to store encoded data slices of pillar 2 when storing encoded data slices of a data block.

The unutilized memory 124 includes a portion of the memory not utilized to store data (e.g., no files). A memory utilization metric includes an amount of memory utilized by both of the object system storage memory 120 and the block system storage memory on 22 divided by a total memory capacity. Alternatively, the memory utilization metric may be calculated as a difference of the total memory capacity and an amount of unutilized memory divided by the total memory capacity. An inode utilization metric includes a number of utilized inumbers divided by a total number of inumbers i. Alternatively, the inode utilization metric may be calculated as a difference of the total number of inumbers i and a number of unutilized inumbers divided by the total number of inumbers i.

Encoded data slice sizes of data blocks (e.g., hundreds of bytes) may be smaller than encoded data slice sizes of data objects (e.g., tens of thousands of bytes). Storing encoded data slices of a common pillar of a data object requires a plurality of files and a corresponding plurality of inode entries and inumbers while storing encoded data slices of a common pillar of a plurality of data blocks requires just one file and just one corresponding inode entry and one inumber. As such, storing data objects may utilize more memory due to overheads associated with a plurality of files and storing data objects may utilize more inode table resources when each encoded data slice is associated with an inumber and inode entry.

Encoded data slices may be stored in the memory 106 based on the memory utilization and the inode utilization. For example, incremental encoded data slices may be stored in the memory 106 when the memory utilization is less than 100% and the inode utilization is less than 100%. As another example, incremental encoded data slices may not be stored in the memory 106 when the memory utilization is 100%. As yet another example, incremental encoded data slices may not be stored in the memory 106 when the inode utilization is 100%. Incremental encoded data slices may be stored in the memory 106 when the inode utilization is 100% and the memory utilization is less than 100% subsequent to executing a memory resource utilization balancing process. The execution of the memory resource utilization balancing process includes allocating more inumbers and inode entries to the inode table and/or reclaiming existing inumbers and inode entries as a result of moving or deleting encoded data slices and or files from at least one memory 106. The method to execute such a memory resource utilization balancing process is discussed in greater detail with reference to FIGS. 6B-11.

In an example of retrieving an encoded slice, a processing module of the DS unit receives a slice retrieval request that includes a slice name corresponding to a file ID of slice 2_1 (e.g., of a data object). The processing module may utilize a slice name to file ID lookup table to determine the file ID. The processing module accesses the directory 102 utilizing a corresponding file ID of slice 2_1 to look up an inumber of 2. The processing module utilizes the inumber 2 as an index into the inode number table 104 to look up associated metadata and a memory address of A2. The processing module retrieves a file with the file ID of slice 2_1 from the object system storage memory 120 at address A2 and extracts the encoded data slice 2_1. The processing module outputs the encoded data slice 2_1 in accordance with the slice retrieval request message.

As another retrieval example, the processing module receives a slice retrieval message that includes a slice name of slice B_1 corresponding to a file ID of pillar 1 (e.g., of a data block). The processing module accesses the directory 102 utilizing a corresponding file ID of pillar 1 to look up an inumber of 300. The processing module utilizes the inumber 300 as an index into the inode memory table 104 to look up associated metadata and a memory address of E1. The processing module extracts a slice address offset from the metadata. The processing module retrieves a file with the file ID of pillar 1 from the block system storage memory 122 at address E1 and extracts the encoded data slice B_1 in accordance with the slice address offset (e.g., multiplying the slice address offset by B to determine an offset index into the file pillar 1). The processing module outputs the encoded data slice B_1 in accordance with the slice retrieval request message. In this example the slice address offset is constant to access any slice of a plurality slices included in the pillar 1 file when each slice of the plurality slices is the same size. Alternatively, the processing module may extract a slice address offset list from the retrieved metadata to determine a unique offset for each encoded data slice stored in a common file.

In an example of storing a slice, the processing module of the DS unit receives a slice storage request that includes a slice name and an encoded data slice. The processing module determines a file ID based on the slice name. For example, the processing module determines the file ID as slice 3_1 when the slice name includes a segment ID of 3 and a pillar ID of 1 and when a flag in the slice name indicates the encoded data slices is associated with a data object. The processing module adds the slice 3_1 file ID to the directory 102 and selects an associated previously unassigned inumber of 3. The processing module stores the encoded data slice in a file with a file ID of slice 3_1 at an available memory address A3 of the object system storage memory 120. Another table may be utilized to maintain a list of available memory addresses. The processing module utilizes the inumber 3 to index into the inode number table 104 to access a corresponding inode entry. The processing module determines the metadata associated with the data (e.g., based on the slice name and the data). The processing module stores the metadata and the memory address A3 in a corresponding inode entry.

FIG. 6B is a diagram of another example embodiment of a DS unit memory structure utilized to illustrate a starting point of an example of modifying the memory structure to produce a modified memory structure illustrated in FIG. 6C. The DS unit memory structure includes a directory 102, at least two inode memory tables 104, and at least two corresponding data storage memories 106. Each data storage memory 106 includes object system storage memory 120 and block system storage memory 122. In this starting point example, encoded data slices 1_1 and 2_1 are stored in two files at addresses A1 and A2 in the object system storage memory 120 of a first memory 106 as indicated by entries in a first inode memory table 104 and encoded data slice 3_1 is stored in one file at addresses B1 in object system storage memory 120 of a second memory 106 as indicated by entries in a second inode memory table 104.

An imbalance between inode memory utilization of the first inode memory 104 and data storage memory utilization of the first data storage memory 106 is determined (e.g., a difference between utilization levels) and is compared to an imbalance threshold. When the comparison is unfavorable (e.g., the imbalance is greater than the imbalance threshold), a rebalancing is attempted as is discussed in greater detail with reference to FIG. 6C. The method to determine the imbalance and rebalance is discussed in greater detail with reference to FIG. 8B.

FIG. 6C is a diagram of another example embodiment of a DS unit memory structure utilized to illustrate an ending point of an example of modifying a memory structure illustrated in FIG. 6B. The DS unit memory structure includes a directory 102, at least two inode memory tables 104, and at least two corresponding data storage memories 106. Each data storage memory 106 includes object system storage memory 120 and block system storage memory 122. In this ending point example, an unfavorable imbalance between inode memory utilization of a first inode memory 104 and data storage memory utilization of a first data storage memory 106 was previously determined.

When the imbalance between the inode memory utilization and the data storage memory utilization compares unfavorably to an imbalance threshold, a determination is made whether utilization of a second inode memory 104 and utilization of a second data storage memory 106 are not imbalanced with respect to an imbalance threshold and that the second data storage memory 106 has available storage space. When the utilization of the second inode memory 104 and the utilization of the second data storage memory 106 are not imbalanced with respect to the imbalance threshold and the second data storage memory 106 has available storage space, a determination is made whether the inode memory utilization is out of balance with respect to the data storage memory utilization or whether the data storage memory utilization is out of balance with respect to the inode memory utilization. For example, a determination is made that the inode memory utilization is out of balance with respect to the data storage memory utilization when data storage memory utilization is below a data storage memory utilization threshold level and inode memory utilization is above an inode memory utilization threshold level. As another example, a determination is made that the data storage memory utilization is out of balance with respect to the inode memory utilization when data storage memory utilization is above the data storage memory utilization level and inode memory utilization is below the inode memory utilization threshold level.

When the inode memory utilization is out of balance with respect to the data storage memory utilization, slice 2_1 (e.g., a data object) is transferred from the first data storage memory 106 to a second data storage memory 106 and mapping information is transferred of slice 2_1 from a first inode memory 104 to a second inode memory 104. The method to determine the imbalance and rebalance is discussed in greater detail with reference to FIG. 8B.

Figure 6D:
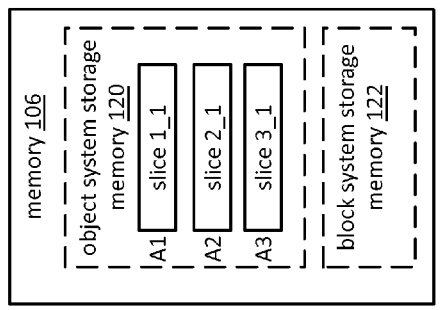
FIG. 6D is a diagram of another example embodiment of a DS unit memory structure in accordance with the invention.
Figure 6E:
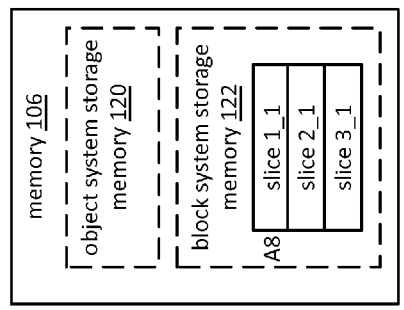
FIG. 6E is a diagram of another example embodiment of a DS unit memory structure in accordance with the invention.

FIG. 6D is a diagram of another example embodiment of a DS unit memory structure utilized to illustrate a starting point of an example of modifying the memory structure to produce a modified memory structure illustrated in FIG. 6E. The DS unit memory structure includes a directory 102, an inode memory table 104, and a corresponding data storage memory 106. The data storage memory 106 includes object system storage memory 120 and block system storage memory 122. In this starting point example, encoded data slices 1_1, 2_1, and 3_1 are stored in three files at addresses A1, A2, and A3 in the object system storage memory 120 of memory 106 as indicated by entries in the inode memory table 104.

An imbalance between inode memory utilization of the inode memory 104 and data storage memory utilization of the data storage memory 106 is determined and is compared to an imbalance threshold. When the comparison is unfavorable a rebalancing is attempted as is discussed in greater detail with reference to FIG. 6E. The method to determine the imbalance and rebalance is discussed in greater detail with reference to FIG. 10B.

FIG. 6E is a diagram of another example embodiment of a DS unit memory structure utilized to illustrate an ending point of an example of modifying a memory structure illustrated in FIG. 6D. The DS unit memory structure includes a directory 102, an inode memory table 104, and a corresponding data storage memory 106. The data storage memory 106 includes object system storage memory 120 and block system storage memory 122. In this ending point example, an unfavorable imbalance between inode memory utilization of the inode memory 104 and data storage memory utilization of the data storage memory 106 was previously determined.

When the imbalance between the inode memory utilization and the data storage memory utilization compares unfavorably to an imbalance threshold, a determination is made whether the inode memory utilization is out of balance with respect to the data storage memory utilization or whether the data storage memory utilization is out of balance with respect to the inode memory utilization. When the inode memory utilization is out of balance with respect to the data storage memory utilization, slices 1_1, 2_1, and 3_1 (e.g., a set of data objects) is transferred from the object system storage memory 120 to the block system storage memory 122 of the memory 106 and object mapping information is transferred of slices 1_1, 2_1, and 3_1 into block mapping information. For example, storage addresses A1, A2, and A3 are released, inumbers 1, 2, and 5 are released, new inumber 6 is utilized along with new address A8 for storage of a single file that contains slices 1_1, 2_1, and 3_1. The method to determine the imbalance and rebalance is discussed in greater detail with reference to FIG. 10B.

FIGS. 7A-7D are diagrams illustrating examples of memory resource utilization that include an inode utilization 130, 146 and a memory utilization 132, 148. The inode utilization 130, 146 includes indicators for object inode utilization 134, block inode utilization 136, and unutilized 138. The object inode utilization 134 indicates a percentage of inode resources utilized for files stored in memory that are associated with a data object. For example, the object inode utilization 134 indicates 30% when 30% of inumbers are utilized for files associated with a data object. The block inode utilization 136 indicates a percentage of inode resources utilized for files stored in memory that are associated with block storage. For example, the block inode utilization indicates 60% when 60% of inumbers are utilized for files associated with block storage. The unutilized indicator 138 indicates a percentage of inode resources that are available but not utilized. For example, the unutilized indicator indicates 10% when 10% of inumbers are unutilized.

The memory utilization 132, 148 includes indicators for object memory utilization 140, block memory utilization 142, and unutilized 144. The object memory utilization 140 indicates a percentage of memory resources utilized for files stored in memory that are associated with a data object. For example, the object memory utilization indicates 40% when 40% of memory capacity is utilized for files associated with a data object. The block memory utilization 142 indicates a percentage of memory resources utilized for files stored in memory that are associated with block storage. For example, the block memory utilization indicates 50% when 50% of memory capacity is utilized for files associated with block storage. The unutilized indicator 144 indicates a percentage of memory resources that are available but not utilized. For example, the unutilized indicator 144 indicates 10% when 10% of memory capacity is unutilized.

FIG. 7A is a diagram illustrating an example of memory resource utilization that includes an inode utilization indicator 130 for a memory 1 and a memory utilization indicator 132 for memory 1 at time=0 (e.g., a starting point for an example). The inode utilization 130 includes object inode utilization 134 of 60%, block inode utilization 136 of 20%, and unutilized 138 of 20% for memory 1 at the starting point. The memory utilization 132 includes object memory utilization 140 of 30%, block memory utilization 142 of 10%, and unutilized 144 of 60% for memory 1 at the starting point. The inode utilization 130 may be out of balance with respect to the memory utilization 132 when the unutilized portion 138 of the inode utilization is 20% and the unutilized portion 144 of the memory is 60%. In such an unbalanced scenario, further storage of encoded data slices to the memory may be prevented when the unutilized portion 138 of the inode utilization shrinks to 0%. Balancing memory resource utilization of the memory 1 is discussed in greater detail with reference to FIG. 7C.

FIG. 7B is a diagram illustrating another example of memory resource utilization that includes an inode utilization indicator 146 for a memory 2l and a memory utilization indicator 148 for memory 2 at time=0 (e.g., a starting point for an example). The inode utilization 146 includes object inode utilization 134 of 20%, block inode utilization 136 of 30%, and unutilized 138 of 50% for memory 2 at the starting point. The memory utilization 148 includes object memory utilization 140 of 10%, block memory utilization 142 of 15%, and unutilized 144 of 75% for memory 2 at the starting point. The memory utilization 148 may be out of balance with respect to the inode utilization 146 when the unutilized portion 148 of the memory utilization is 75% and the unutilized portion 138 of the inode utilization is 50%. In such an unbalanced scenario, memory 2 has significant unutilized memory capacity and unutilized inode capacity such that memory 2 may be utilized to store encoded data slices transferred from another memory in a memory utilization balancing process. Balancing memory resource utilization of the memory 1 and 2 is discussed in greater detail with reference to FIGS. 7C-7D.

FIG. 7C is a diagram illustrating another example of memory resource utilization that includes an inode utilization indicator 130 for a memory 1 and a memory utilization indicator 132 for memory 1 at time=1 (e.g., a next step a balancing example). In such a balancing example, encoded data slices associated with the storage of one or more data objects are moved from memory 1 to another memory (e.g., memory 2) thus freeing up inode resources associated with memory 1 so that more memory of memory 1 may be utilized. Encoded data slices associated with block storage are transferred to memory 1 from memory 2 thus utilizing more memory of memory 1 while utilizing proportionally utilizing more inode resources for block storage as compared to the starting point. The inode utilization now includes object inode utilization 134 of 40%, block inode utilization 136 of 25%, and unutilized 138 of 35% for memory 1 at the next step when a portion of encoded data slices associated with data objects are moved from memory 1 to memory 2. The memory utilization 132 includes object memory utilization 140 of 20%, block memory utilization 142 of 13%, and unutilized 144 of 62% for memory 1 at the next step after balancing. The unutilized inode resources 138 moves to 35% from 20% while the unutilized memory utilization 144 moves to 62% from 60%. The methods to determine when to balance memory resource utilization and how to balance the memory resource utilization are described in greater detail with reference to FIGS. 8A-11.

FIG. 7D is a diagram illustrating another example of memory resource utilization that includes an inode utilization indicator 146 for a memory 2 and a memory utilization indicator 148 for memory 2 at time=1 (e.g., a next step a balancing example). In such a balancing example, encoded data slices associated with the storage of one or more data objects are moved from memory 1 to memory 2 thus utilizing more inode resources associated with memory 2 such that more memory of memory 2 is utilized. Encoded data slices associated with block storage are transferred from memory 2 to memory 1 thus equally balancing inode utilization and memory utilization between memories 1 and 2. The inode utilization 146 now includes object inode utilization 134 of 40%, block inode utilization 136 of 25%, and unutilized 138 of 35% for memory 2 (e.g., same as memory 1) at the next step when a portion of encoded data slices associated with data objects are moved from memory 1 memory 2. The memory utilization 148 includes object memory utilization 140 of 20%, block memory utilization 142 of 13%, and unutilized 144 of 62% for memory 2 at the next step after balancing. As another example, utilization indicators are different when such balancing does not equal between two memories. The unutilized inode resources 138 moves to 35% from 50% while the unutilized memory utilization 144 moves to 62% from 75%.

Figure 8A:
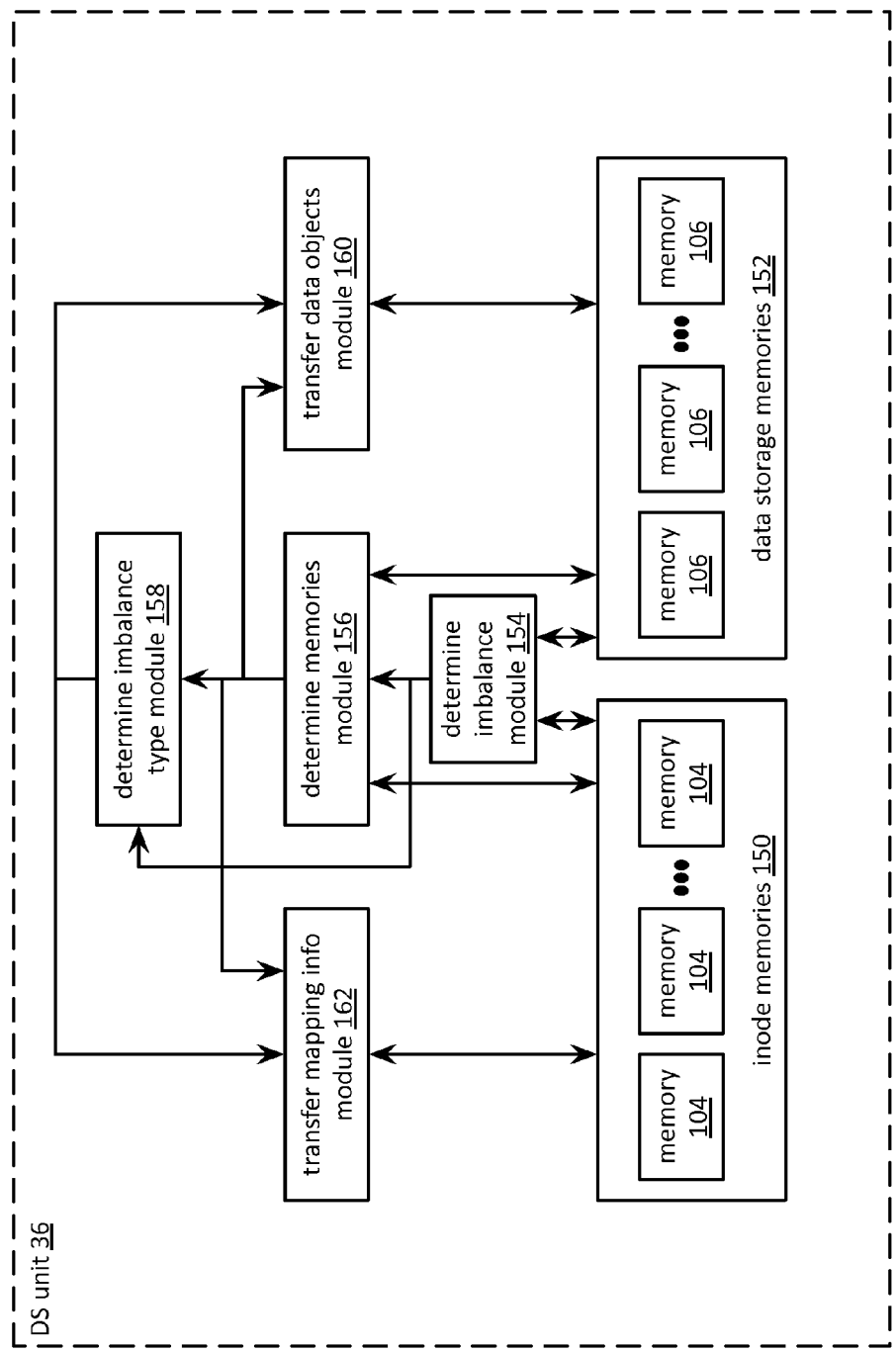
FIG. 8A is a schematic block diagram of an embodiment of a DS unit in accordance with the invention.

FIG. 8A is a schematic block diagram of an embodiment of a dispersed storage (DS) unit that includes a plurality of inode memories 150, a plurality of data storage memories 152, a determine imbalance module 154, a determine memories module 156, a determine imbalance type module 158, a transfer data objects module 160, and a transfer mapping information module 162. The plurality of inode memories 150 includes one or more inode memories 104 the plurality of data storage memories 152 includes one or more memories 106.

The determine imbalance module 154 is operable to determine an imbalance between inode memory utilization of one of the plurality of inode memories 150 and data storage memory utilization of a corresponding one of the plurality of data storage memories 152, wherein the corresponding one of a plurality of data storage memories 152 stores data as objects or as blocks, and wherein the one of a plurality of inode memories 150 stores mapping information that associates directory information of the data with storage location information of the data. The determining includes one or more of accessing at least one of a directory and an inode table to count a number of inodes associated with each of the two or more storage types, a lookup, a query, retrieval from the memory, obtaining a total number of inodes associated with the DSN memory, calculating inode memory utilization level as a number of utilized inodes by type divided by a total number of assigned inodes, accessing at least one of the directory and the inode table to access a metadata field associated with the memory and to retrieve and add up slice sizes for the slices stored in the memory, a lookup, a query, retrieval from the memory, a memory utilization indicator, calculating the data storage memory utilization level as a memory utilization amount per type divided by an amount of memory.

When the imbalance between the inode memory utilization and the data storage memory utilization compares unfavorably to an imbalance threshold, the determine memories module 156 is operable to determine whether utilization of another inode memory of the plurality of inode memories 150 and utilization of another corresponding data storage memory of the plurality of data storage memories 152 are not imbalanced with respect to the imbalance threshold and that the other corresponding data storage memory has available storage space. When the utilization of the other inode memory and the utilization of the other corresponding data storage memory are not imbalanced with respect to the imbalance threshold and the other corresponding data storage memory has available storage space, the determine imbalance type module 158 is operable to determine whether the inode memory utilization is out of balance with respect to the data storage memory utilization or whether the data storage memory utilization is out of balance with respect to the inode memory utilization.

When the inode memory utilization is out of balance with respect to the data storage memory utilization (e.g., too many objects stored), the transfer data objects module 160 is operable to transfer data objects from the corresponding one of the plurality of data storage memories 152 to the other corresponding data storage memory and the transfer mapping information module 162 is operable to transfer mapping information of the data objects from the one of the plurality of inode memories 150 to the other inode memory. The transfer data objects module 160 is further operable to transfer the data objects by determining a desired amount of the data objects to transfer based on a difference between a desire imbalance and the imbalance, determining whether transferring the desired amount of the data objects will cause the utilization of the other inode memory and the utilization of the other corresponding data storage memory to become imbalanced with respect to the imbalance threshold, and when the transferring the desired amount of the data objects will not cause the utilization of the other inode memory and the utilization of the other corresponding data storage memory to become imbalanced with respect to the imbalance threshold, transferring the desired amount of the data objects.

When the transferring the desired amount of the data objects will cause the utilization of the other inode memory and the utilization of the other corresponding data storage memory to become imbalanced with respect to the imbalance threshold, the transfer data objects module 160 is further operable to scale back on the desired amount of data objects until the transferring the data objects will not cause the utilization of the other inode memory and the utilization of the other corresponding data storage memory to become imbalanced with respect to the imbalance threshold to produce a scaled amount of data objects. The transfer data objects module 160 is further operable to transfer the scaled amount of data objects to the other corresponding data storage memory.

For a difference amount of data objects, the determine memories module 156 is further operable to determine whether utilization of a third inode memory of the plurality of inode memories 150 and utilization of a third corresponding data storage memory of the plurality of data storage memories 152 are not imbalanced with respect to the imbalance threshold and that the third corresponding data storage memory has available storage space, wherein the difference amount of data objects corresponds to a difference between the desired amount of data objects and the scaled amount of data objects. When the utilization of the third inode memory and the utilization of the third corresponding data storage memory are not imbalanced with respect to the imbalance threshold and that the third corresponding data storage memory has available storage space, the transfer data objects module 160 is further operable to transfer the difference amount of data objects to the third corresponding data storage memory and the transfer mapping information module 162 is further operable to transfer mapping information of the difference amount of the data objects from the one of the plurality of inode memories 150 to the third inode memory.

When the data storage memory utilization is out of balance with respect to the inode memory utilization (e.g., too many blocks stored), the transfer data objects module 160 is further operable to transfer data blocks from the corresponding one of the plurality of data storage memories 152 to the other corresponding data storage memory and the transfer mapping information module 162 is further operable to transfer mapping information of the data blocks from the one of the plurality of inode memories 150 to the other inode memory.

The transfer data objects module 160 is further operable to transfer data blocks by determining a desired amount of the data blocks to transfer based on a difference between a desire imbalance and the imbalance, determine whether transferring the desired amount of the data blocks will cause the utilization of the other inode memory and the utilization of the other corresponding data storage memory to become imbalanced with respect to the imbalance threshold, and when the transferring the desired amount of the data blocks will not cause the utilization of the other inode memory and the utilization of the other corresponding data storage memory to become imbalanced with respect to the imbalance threshold, transfer the desired amount of the data blocks.

When the transferring the desired amount of the data blocks will cause the utilization of the other inode memory and the utilization of the other corresponding data storage memory to become imbalanced with respect to the imbalance threshold, the transfer data objects module 160 is further operable to scale back on the desired amount of data blocks until the transferring the data blocks will not cause the utilization of the other inode memory and the utilization of the other corresponding data storage memory to become imbalanced with respect to the imbalance threshold to produce a scaled amount of data blocks. The transfer data objects module 160 is further operable to transfer the scaled amount of data blocks to the other corresponding data storage memory.

For a difference amount of data blocks, the determine memories module 156 is further operable to determine whether utilization of a third inode memory of the plurality of inode memories 150 and utilization of a third corresponding data storage memory of the plurality of data storage memories 152 are not imbalanced with respect to the imbalance threshold and that the third corresponding data storage memory has available storage space, wherein the difference amount of data blocks corresponds to a difference between the desired amount of data blocks and the scaled amount of data blocks, and when the utilization of the third inode memory and the utilization of the third corresponding data storage memory are not imbalanced with respect to the imbalance threshold and that the third corresponding data storage memory has available storage space, the transfer data objects module 160 is further operable to transfer the difference amount of data blocks to the third corresponding data storage memory and the transfer mapping information module 162 is further operable to transfer mapping information of the different amount of the data blocks from the one of the plurality of inode memories 150 to the third inode memory.

FIG. 8B is a flowchart illustrating an example of balancing memory resource utilization. The method begins with step 170 were a processing module (e.g., of a dispersed storage (DS) unit) determines an imbalance between inode memory utilization of one of a plurality of inode memories and data storage memory utilization of a corresponding one of a plurality of data storage memories, wherein the corresponding one of a plurality of data storage memories stores data as objects or as blocks, and wherein the one of a plurality of inode memories stores mapping information that associates directory information of the data with storage location information of the data.

When the imbalance between the inode memory utilization and the data storage memory utilization compares unfavorably to an imbalance threshold, the method continues at step 172 where the processing module determines whether utilization of another inode memory of the plurality of inode memories and utilization of another corresponding data storage memory of the plurality of data storage memories are not imbalanced with respect to the imbalance threshold and that the other corresponding data storage memory has available storage space. When the utilization of the other inode memory and the utilization of the other corresponding data storage memory are not imbalanced with respect to the imbalance threshold and the other corresponding data storage memory has available storage space, the method continues at step 174 where the processing module determines whether the inode memory utilization is out of balance with respect to the data storage memory utilization or whether the data storage memory utilization is out of balance with respect to the inode memory utilization. The method branches to step 194 when the processing module determines that the data storage memory utilization is out of balance with respect to the inode memory utilization. The method continues to step 176 when the processing module determines that the inode memory utilization is out of balance with respect to the data storage memory utilization.

The method continues at step 176 where the processing module determines a desired amount of the data objects to transfer from the corresponding one of a plurality of data storage memories to the other corresponding data storage based on a difference between a desire imbalance and the imbalance when the inode memory utilization is out of balance with respect to the data storage memory utilization (e.g., too many objects stored). For example, the processing module determines the desired amount of the data objects to transfer as an amount to change the difference to zero.

The method continues at step 178 where the processing module determines whether transferring the desired amount of the data objects will cause the utilization of the other inode memory and the utilization of the other corresponding data storage memory to become imbalanced with respect to the imbalance threshold. The method branches to step 184 when the processing module determines that the transferring the desired amount of the data objects will cause the utilization of the other inode memory and the utilization of the other corresponding data storage memory to become imbalanced with respect to the imbalance threshold. The method continues to step 180 when the processing module determines that the transferring the desired amount of the data objects will not cause the utilization of the other inode memory and the utilization of the other corresponding data storage memory to become imbalanced with respect to the imbalance threshold. The method continues at step 180 where the processing module transfers the desired amount of the data objects. The method continues at step 182 where the processing module transfers mapping information of the data objects from the one of a plurality of inode memories to the other inode memory.

The method continues at step 184 where the processing module scales back on the desired amount of data objects until the transferring the data objects will not cause the utilization of the other inode memory and the utilization of the other corresponding data storage memory to become imbalanced with respect to the imbalance threshold to produce a scaled amount of data objects. The method continues at step 186 where the processing module transfers the scaled amount of data objects to the other corresponding data storage memory. For a difference amount of data objects, the method continues at step 188 where the processing module determines whether utilization of a third inode memory of the plurality of inode memories and utilization of a third corresponding data storage memory of the plurality of data storage memories are not imbalanced with respect to the imbalance threshold and that the third corresponding data storage memory has available storage space, wherein the difference amount of data objects corresponds to a difference between the desired amount of data objects and the scaled amount of data objects.

The method continues at step 190 where the processing module transfers the difference amount of data objects to the third corresponding data storage memory when the utilization of the third inode memory and the utilization of the third corresponding data storage memory are not imbalanced with respect to the imbalance threshold and that the third corresponding data storage memory has available storage space. The method continues at step 192 where the processing module transfers mapping information of the difference amount of the data objects from the one of a plurality of inode memories to the third inode memory.

The method continues at step 194 where the processing module transfers data blocks from the corresponding one of a plurality of data storage memories to the other corresponding data storage memory when the data storage memory utilization is out of balance with respect to the inode memory utilization (e.g., too many blocks stored). The transferring data blocks includes determining a desired amount of the data blocks to transfer based on a difference between a desire imbalance and the imbalance, determining whether transferring the desired amount of the data blocks will cause the utilization of the other inode memory and the utilization of the other corresponding data storage memory to become imbalanced with respect to the imbalance threshold, and when the transferring the desired amount of the data blocks will not cause the utilization of the other inode memory and the utilization of the other corresponding data storage memory to become imbalanced with respect to the imbalance threshold, transferring the desired amount of the data blocks.

When the transferring the desired amount of the data blocks will cause the utilization of the other inode memory and the utilization of the other corresponding data storage memory to become imbalanced with respect to the imbalance threshold, the processing module scales back on the desired amount of data blocks until the transferring the data blocks will not cause the utilization of the other inode memory and the utilization of the other corresponding data storage memory to become imbalanced with respect to the imbalance threshold to produce a scaled amount of data blocks; transfers the scaled amount of data blocks to the other corresponding data storage memory; for a difference amount of data blocks, determines whether utilization of a third inode memory of the plurality of inode memories and utilization of a third corresponding data storage memory of the plurality of data storage memories are not imbalanced with respect to the imbalance threshold and that the third corresponding data storage memory has available storage space, wherein the difference amount of data blocks corresponds to a difference between the desired amount of data blocks and the scaled amount of data blocks; and when the utilization of the third inode memory and the utilization of the third corresponding data storage memory are not imbalanced with respect to the imbalance threshold and that the third corresponding data storage memory has available storage space, the processing module transfers the difference amount of data blocks to the third corresponding data storage memory and transfers mapping information of the different amount of the data blocks from the one of a plurality of inode memories to the third inode memory. The method continues at step 196 where the processing module transfers mapping information of the data blocks from the one of a plurality of inode memories to the other inode memory.

Figure 9:
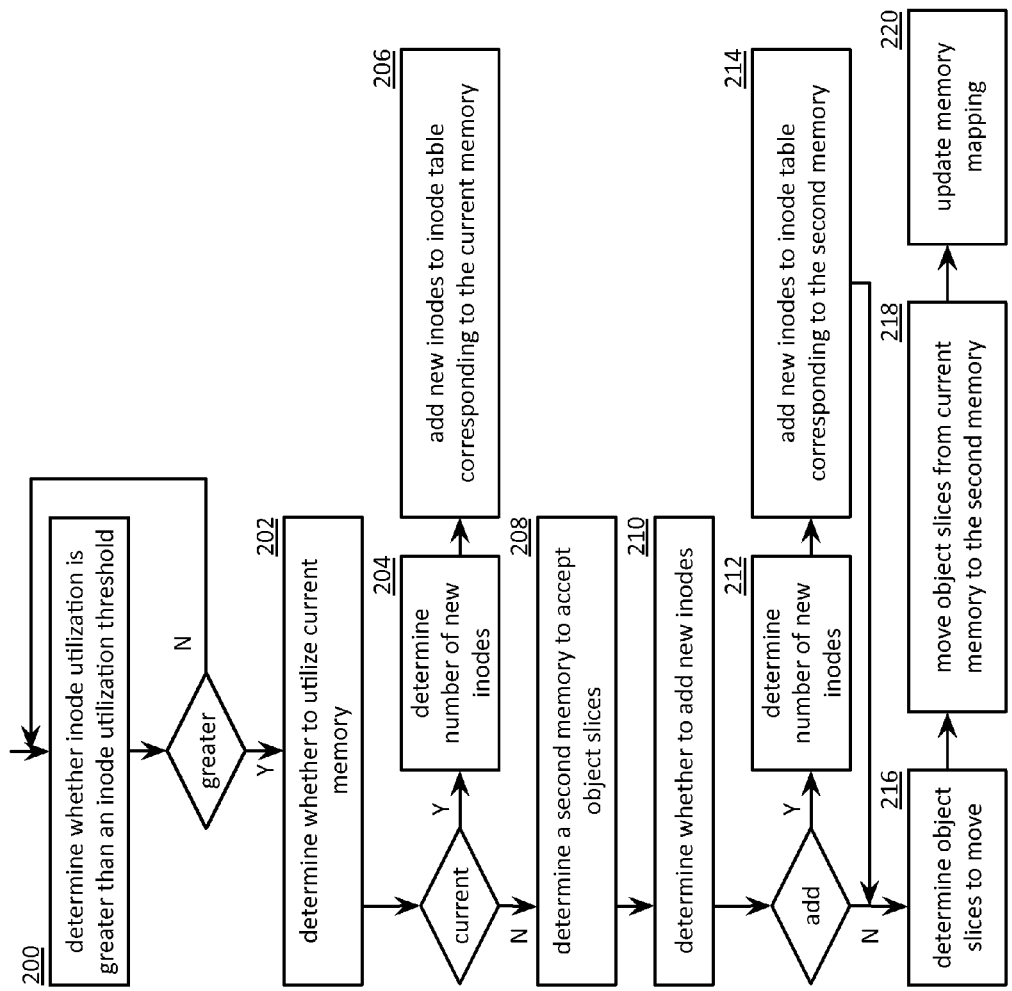
FIG. 9 is a flowchart illustrating an example of adding memory resources in accordance with the invention.

FIG. 9 is a flowchart illustrating an example of adding memory resources. The method begins with step 200 where a processing module determines whether inode utilization is greater than an inode utilization threshold. The method loops back to step 200 when the processing module determines that the inode utilization is not greater than the inode utilization threshold. The method continues to step 202 when the processing module determines that the inode utilization is greater than the inode utilization threshold.

The method continues at step 202 where the processing module determines whether to utilize current memory. The determination may be based on one or more of a current memory utilization, a memory utilization threshold, a memory status indicator, a system status indicator, and a memory use authentication indicator. For example, the processing module determines to utilize the current memory when the current memory utilization is less than the memory utilization threshold. The method branches to step 208 when the processing module determines not to utilize the current memory. The method continues to step 204 when the processing module determines to utilize the current memory. The method continues at step 204 where the processing module determines a number of new inodes. The determination may be based on the inode utilization and a calculation to determine the number of new inodes to allocate such that a new inode utilization is less than a new inode utilization threshold. For instance, the inode utilization threshold is less than the inode utilization threshold to provide hysteresis. The method continues at step 206 where the processing module adds new inodes to the inode table corresponding to the current memory in accordance with the number of new inodes. For example, the processing module expands the inode table by the number of new inodes.

The method continues at step 208 where the processing module determines a second memory to accept object slices when the processing module determines to not utilize the current memory. The determination may be based on one or more of a memory utilization indicator of the second memory and a second memory utilization threshold. For example, the processing module determines the second memory when the memory utilization indicator of the second memory is less than the second memory utilization threshold.

The method continues at step 210 where the processing module determines whether to add new inodes associated with the second memory. The determination may be based on one or more of an inode utilization indicator associated with the second memory and a second inode utilization threshold. For example, the processing module determines to add new inodes when the inode utilization indicator associated with the second memory is greater than the second inode utilization threshold. The method branches to step 216 when the processing module determines not to add new inodes to the second memory. The method continues to step 212 when the processing module determines to add new inodes. The method continues at step 212 where the processing module determines a number of new inodes. The determination may be based on the inode utilization associated with the second memory and a calculation to determine the number of new inodes to allocate such that a new inode utilization is less than a new inode utilization threshold. The method continues at step 214 where the processing module adds new inodes to the inode table corresponding to the second memory in accordance with the number of new inodes. The method branches to step 216.

The method continues at step 216 where the processing module determines object slices to move to affect cure of the inode utilization level. The method continues at step 218 where the processing module moves the determined object slices from the current memory to the second (e.g., available) memory. The method continues at step 220 where the processing module updates a memory mapping in accordance with where the object slices were moved.

Figure 10A:
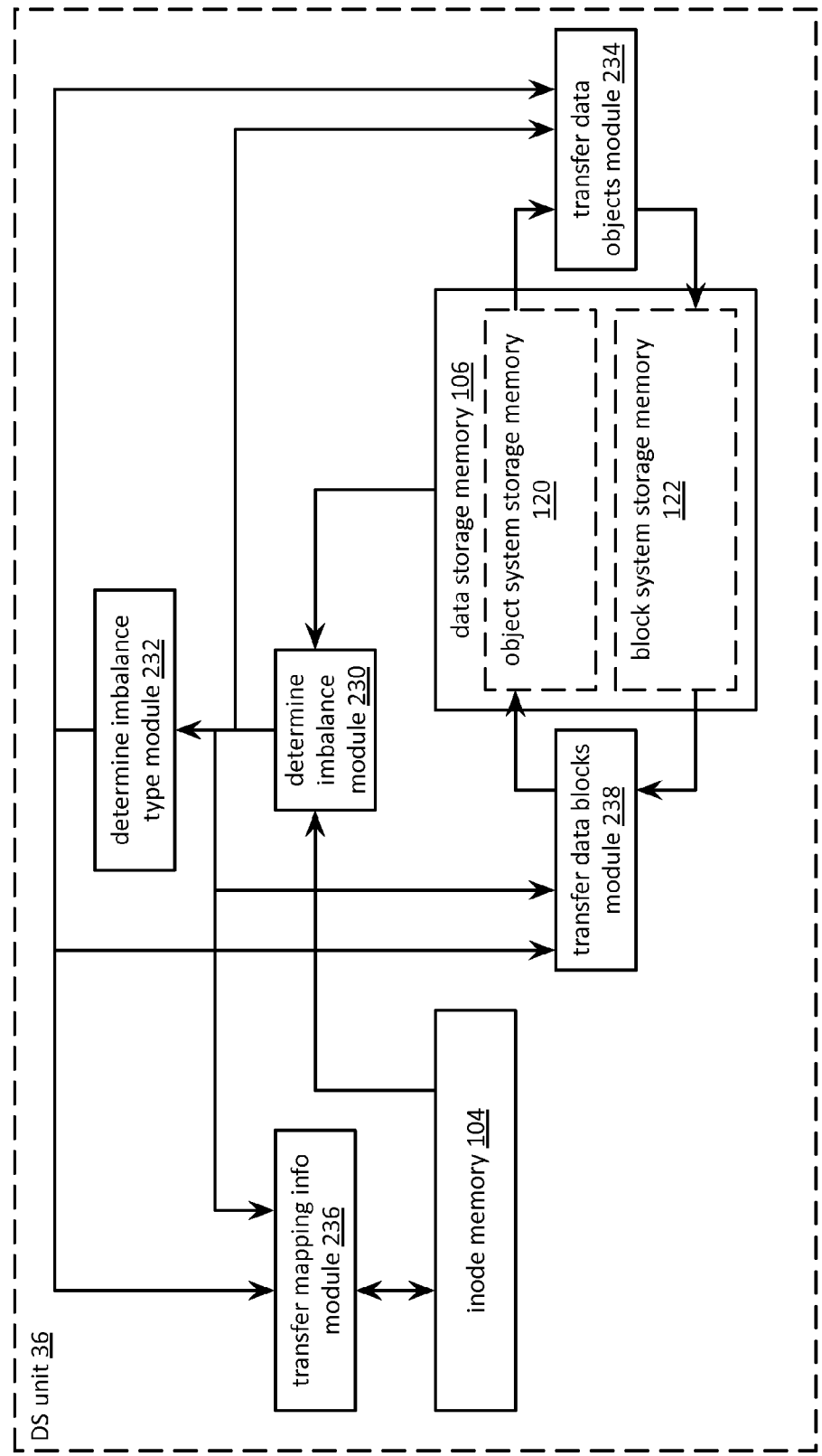
FIG. 10A is a schematic block diagram of another embodiment of a DS unit in accordance with the invention.

FIG. 10A is a schematic block diagram of another embodiment of a dispersed storage (DS) unit that includes an inode memory 104, a data storage memory 106, a determine imbalance module 230, a determine imbalance type module 232, a transfer data objects module 234, a transfer mapping module 236, and a transfer data blocks module 238. The determine imbalance module 230 is operable to determine an imbalance between inode memory utilization of the inode memory 104 and data storage memory utilization of the data storage memory 106, wherein the data storage memory 106 stores data objects in a data object section 120 and stores data blocks in a data block section 122, and wherein the inode memory 104 stores object mapping information that associates object directory information of the data objects with object storage location information of the data objects and stores block mapping information that associates block directory information of the data objects with block storage location information of the data blocks. A data object of the data objects includes an encoded data slice, wherein a data segment is encoded into a plurality of encoded data slices in accordance with a dispersed storage error coding functions, and wherein the encoded data slice is one of the plurality of encoded data slices.

The determine imbalance type module 232 is operable to determine whether the inode memory utilization is out of balance with respect to the data storage memory utilization or whether the data storage memory utilization is out of balance with respect to the inode memory utilization when the imbalance between the inode memory utilization and the data storage memory utilization compares unfavorably to an imbalance threshold. The transfer data objects module 234 is operable to transfer a set of data objects from the data object section 120 to the data block section 122 when the inode memory utilization is out of balance with respect to the data storage memory utilization (e.g., too many objects stored).

The transfer data objects module 234 is further operable to transfer the set of data objects by identifying one or more of the data objects that include a common pillar number and/or a common source name as the set of data objects, determining an address offset value between data objects of the set of data objects based on the common pillar number and size of the data objects of the set of data objects, aggregating the set of data objects into an aggregated data block in accordance with the address offset value, and storing aggregated data block as the set of data objects in the data block section 122. The transfer data objects module 234 is further operable to determine the address offset value by obtaining different sizes for data objects of the set of data objects (e.g., obtaining based on at least one of counting bytes of each slice, accessing a metadata field of the memory mapping to extract a slice size), determining a maximum size from the difference sizes, generating the address offset value based on the maximum size, and saving the address offset value (e.g., storing in a metadata field).

The transfer mapping module 236 is operable to transfer object mapping information of the set of data objects into block mapping information for the set of data objects when the inode memory utilization is out of balance with respect to the data storage memory utilization. The transfer mapping module 236 is further operable to transfer the object mapping information of the set of data objects by converting data object addresses of the set of data objects into a data block address based on the address offset value and replacing the data object addresses of the set of data objects with the data block address (e.g., overwriting, writing new address and then deleting old address).

The transfer data blocks module 238 is operable to transfer a data block of the data blocks from the data block section 122 to the data object section 120 when the data storage memory utilization is out of balance with respect to the inode memory utilization (e.g., too many blocks stored). The transfer data blocks module 238 is further operable to transfer the data block by dividing the data block into a set of transfer data objects, generating data object addresses for the set of transfer data objects based on a data block address of the data block and a size of transfer data objects of the set of transfer data objects, and storing the set of transfer data objects in the data object section 120.

The transfer mapping information module 236 is further operable to transfer block mapping information of the data block into object mapping information for the data block when the data storage memory utilization is out of balance with respect to the inode memory utilization. The transfer mapping information module 236 is further operable transfer the block mapping information of the set of data objects by converting a data block address of the data block into a set of data object addresses based on the address offset value and the data block address and replacing the data block address of the data block with the set of data object addresses.

FIG. 10B is a flowchart illustrating an example of aggregating memory resources. The method begins at step 240 where processing module (e.g., of a dispersed storage (DS) unit) determines an imbalance between inode memory utilization of an inode memory and data storage memory utilization of a data storage memory, wherein the data storage memory stores data objects in a data object section and stores data blocks in a data block section, and wherein the inode memory stores object mapping information that associates object directory information of the data objects with object storage location information of the data objects and stores block mapping information that associates block directory information of the data objects with block storage location information of the data blocks. A data object of the data objects includes an encoded data slice, wherein a data segment is encoded into a plurality of encoded data slices in accordance with a dispersed storage error coding functions, and wherein the encoded data slice is one of the plurality of encoded data slices.

When the imbalance between the inode memory utilization and the data storage memory utilization compares unfavorably to an imbalance threshold, the method continues at step 242 where the processing module determines whether the inode memory utilization is out of balance with respect to the data storage memory utilization or whether the data storage memory utilization is out of balance with respect to the inode memory utilization. The method branches to step 254 to facilitate transferring at least one data block of the data blocks from the data block section to the data object section when the data storage memory utilization is out of balance with respect to the inode memory utilization. The method continues to step 244 to facilitate transferring a set of data objects from the data object section to the data block section when the inode memory utilization is out of balance with respect to the data storage memory utilization.

The method continues at step 244 where the processing module identifies one or more of the data objects that include a common pillar number and/or a common source name as the set of data objects when the inode memory utilization is out of balance with respect to the data storage memory utilization (e.g., too many objects stored). The method continues at step 246 where the processing module determines an address offset value between data objects of the set of data objects based on the common pillar number and size of the data objects of the set of data objects. The determining the address offset value includes obtaining different sizes for data objects of the set of data objects, determining a maximum size from the difference sizes, and generating the address offset value based on the maximum size.

The method continues at step 248 where the processing module aggregates the set of data objects into an aggregated data block in accordance with the address offset value. The method continues at step 250 where the processing module stores the aggregated data block as the set of data objects in the data block section. The method continues at step 252 where the processing module transfers object mapping information of the set of data objects into block mapping information for the set of data objects when the inode memory utilization is out of balance with respect to the data storage memory utilization. The transferring the object mapping information of the set of data objects includes converting data object addresses of the set of data objects into a data block address based on the address offset value and replacing the data object addresses of the set of data objects with the data block address.

The method continues at step 254 where the processing module facilitates transferring a data block of the data blocks from the data block section to the data object section when the data storage memory utilization is out of balance with respect to the inode memory utilization by dividing the data block into a set of transfer data objects. The method continues at step 256 where the processing module generates data object addresses for the set of transfer data objects based on a data block address of the data block and a size of transfer data objects of the set of transfer data objects. The method continues at step 258 where the processing module stores the set of transfer data objects in the data object section.

The method continues at step 260 where the processing module facilitates transferring block mapping information of the data block into object mapping information for the data block by converting a data block address of the data block into a set of data object addresses based on the address offset value and the data block address. Alternatively, or in addition to, the processing module converts each data block address of each data block of a plurality of data blocks into a corresponding set of data object addresses based on corresponding address offset values and corresponding data block addresses when there are two or more data blocks. The method continues at step 262 where the processing module replaces the data block address of the data block with the set of data object addresses.

Figure 11:
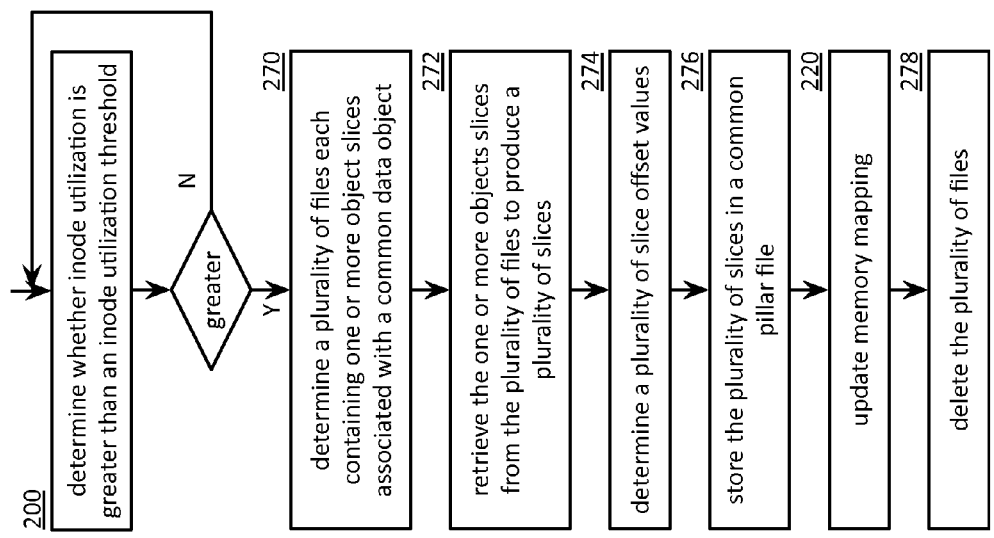
FIG. 11 is a flowchart illustrating another example of aggregating memory resources in accordance with the invention.

FIG. 11 is a flowchart illustrating another example of aggregating memory resources, that includes similar steps to FIG. 9. The method begins with step 200 of FIG. 9 where a processing module (e.g., of a dispersed storage (DS) unit) determines whether inode utilization is greater than an inode utilization threshold and continues with step 270 where the processing module determines a plurality of files each containing one or more object slices associated with a common data object when the processing module determines that the inode utilization is greater than the inode utilization threshold. The method continues with step 272 where the processing module retrieves the one or more object slices from the plurality of files to produce a plurality of slices.

The method continues at step 274 where the processing module determines a plurality of slice offset values. The determination may be based on one or more of a size indicator of each encoded data slice of the plurality of slices, counting a number of bytes of each encoded data slice of the plurality of slices, a vault lookup, a metadata lookup, and a predetermination. For example, the processing module counts the number of bytes of each encoded data slice of the plurality slices to determine the plurality of slice offset values. The method continues at step 276 where the processing module stores a plurality slices in a common pillar file one slice after the other such that exists between the slices within the common pillar file. The method continues with step 220 of FIG. 9 where the processing module updates a memory mapping, wherein metadata stored in an inode table includes the plurality of slice offset values. The method continues with step 278 where the processing module deletes the plurality of files to free up memory space.

Figure 12:
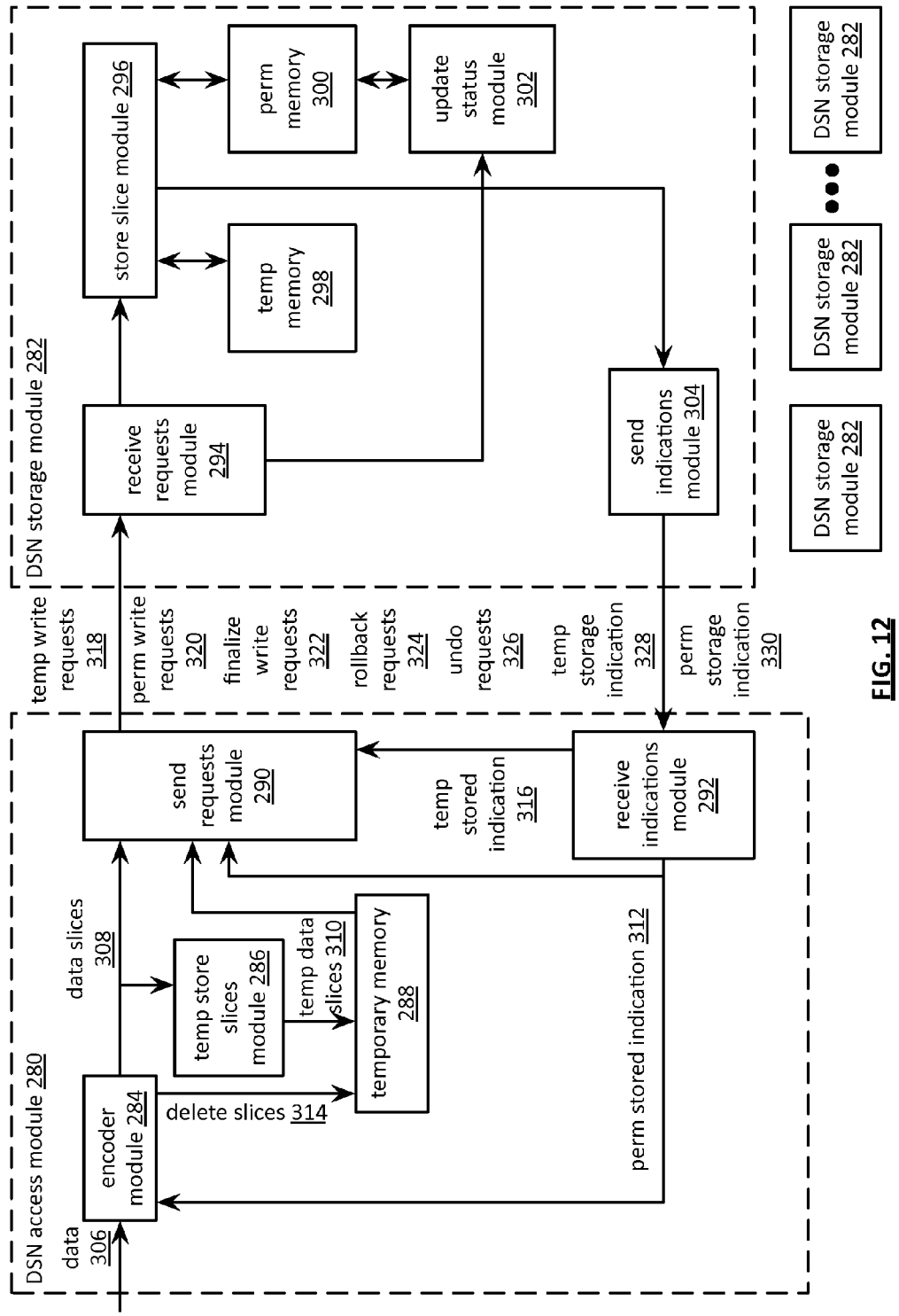
FIG. 12 is a schematic block diagram of another embodiment of a computing system in accordance with the invention.

FIG. 12 is a schematic block diagram of another embodiment of a computing system that includes a dispersed storage network (DSN) access module 280 and a plurality of DSN storage modules 282. The DSN access module 280 includes an encoder module 284, a send requests module 290, a receive indications module 292, a temporarily store slices module 286, and temporary memory 288. Each DSN storage module 282 of the plurality of DSN storage modules includes a receive requests module 294, a store slices module 296, a temporary memory 298, a permanent memory 300, a send indications module 304, and an update status module 302.

With respect to the DSN access module 280, the encoder module 204 is operable to encode a data segment of data 306 to produce a set of encoded data slices 308. The send requests module 290 is operable to send at least a write threshold number of temporary write requests 318 to at least a write threshold number of DSN storage modules 282, wherein the write threshold number of temporary write requests 318 includes at least a write threshold number of the set of encoded data slices 308. The receive indications module 292 is operable to receive an indication of temporary storage 328 of encoded data slices from at least some of the at least a write threshold number of DSN storage modules 282.

The send requests module 290 is further operable to, when a write threshold number of indications of temporary storage 328 have been received (e.g., via the receive indications module 292 and indicated via a temporary storage indication 316), sends at least a write threshold number of permanent write requests 320 to the at least a write threshold number of DSN storage modules 282. The receive indications module 292 is further operable to receive an indication of permanent storage 330 of the encoded data slice from at least some of the at least a write threshold number of DSN storage modules 282.

The temporarily store slices module 286 is operable to temporarily store the set of encoded data slices 308 to produce a set of temporarily stored encoded data slices 310 in temporary memory 288. The encoder module 284 is further operable to, when a write threshold number of indications of permanent storage 330 have been received (e.g., by the receive indications module 292 and indicated by a permanent storage indication 312), delete the set of temporarily stored encoded data slices 310 from the temporary memory 288 via delete slices indication 314.

The send requests module 290 is further operable to, when a write threshold number of indications of permanent storage 330 have been received (e.g., via the receive indications module 292 and indicated by the permanently stored indication 312), send at least a write threshold number of finalize write requests 322 to the at least a write threshold number of DSN storage modules 282. The send requests module 290 is further operable to, when a write threshold number of indications of temporary storage 328 have not been received (e.g., as received by the receive indications module 292 and indicated by a temporarily stored indication 316), send a plurality of rollback messages 324 to the at least a write threshold number of DSN storage modules 282. The send requests module 290 is further operable to, when the write threshold number of indications of permanent storage 330 have not been received, send a plurality of undo messages 326 to the at least a write threshold number of DSN storage modules 282.

With respect to the DSN storage module 282, the receive requests module 294 is operable to receive temporary write request 318 that includes an encoded data slice of the set of encoded data slices 308, wherein a data segment of data 306 was encoded in accordance with a dispersed storage error coding function to produce the set of encoded data slices 308. In response to the temporary write request 318, the store slice module 296 is operable to temporarily store the encoded data slice to produce a temporarily stored encoded data slice in the temporary memory 298 and the send indications module 304 is operable to send an indication of temporary storage 328 of the encoded data slice.

The receive requests module 294 is further operable to receive a permanent write request 320 regarding the temporarily stored encoded data slice. In response to the permanent write request 320 the store slice module 296 is further operable to store the temporarily stored encoded data slice in the permanent memory 300 and the send indications module 304 is further operable to send an indication of permanent storage 330 of the encoded data slice. The receive requests module 294 is further operable to receive a finalize write request 322. In response to the finalize write request 322, the update status module 302 is operable to determine whether a previous revision of the encoded data slices is stored in the permanent memory 300 and update an availability status to indicate that the previous revision of the encoded data slice is unavailable.

The store slice module 296 is further operable to delete the temporarily stored encoded data slice from the temporary memory 298.

The receive requests module 294 is further operable to receive a rollback request message 324. In response to the rollback message 324, the store slice module 296 is operable to delete the temporarily stored encoded data slice from the temporary memory 298. The receive requests module 294 is further operable to receive an undo request message 326. In response to the undo message 326, the store slice module is operable to delete the temporarily stored encoded data slice from the permanent memory 300.

Figure 13:
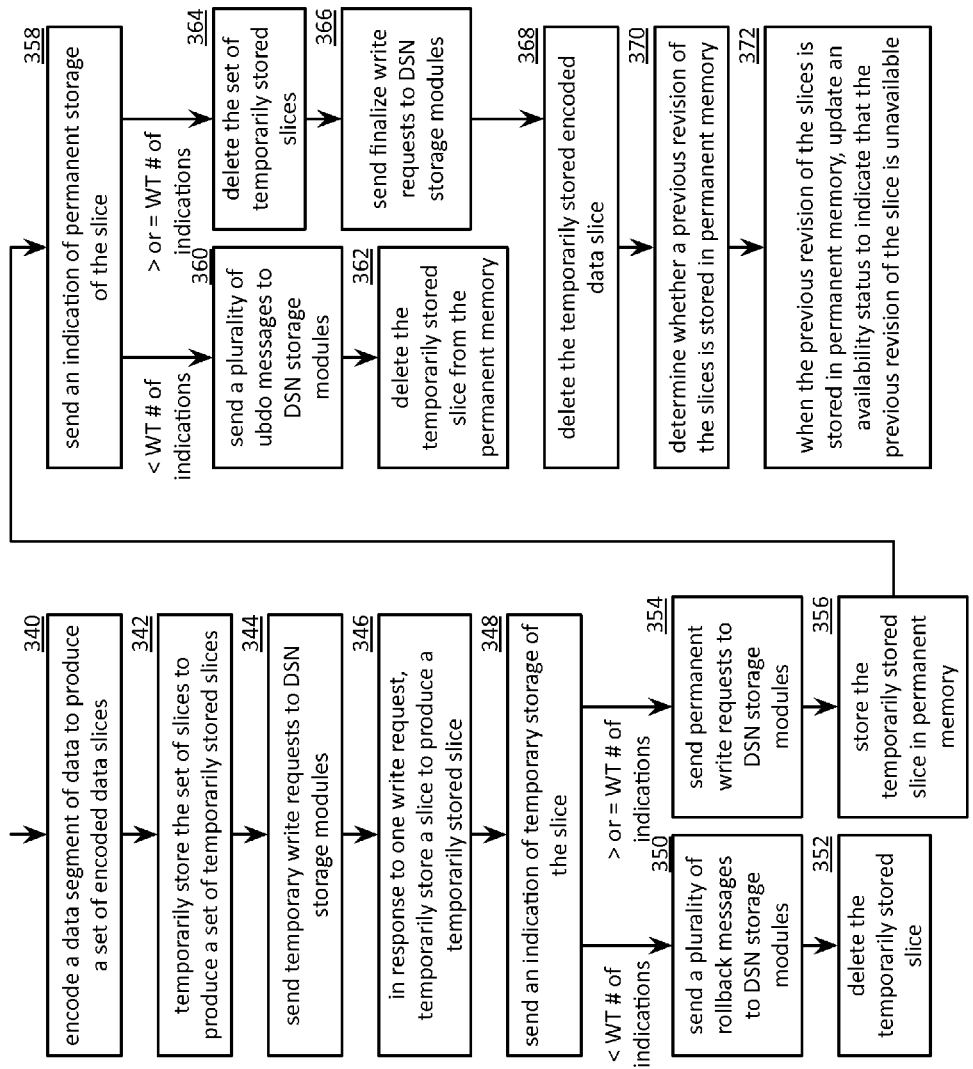
FIG. 13 is a flowchart illustrating an example of storing encoded slices in accordance with the invention.

FIG. 13 is a flowchart illustrating an example of storing encoded slices. The method begins at step 340 where dispersed storage network (DSN) access module encodes a data segment of data to produce a set of encoded data slices. The method continues at step 342 where the DSN access module temporarily stores the set of encoded data slices to produce a set of temporarily stored encoded data slices. The method continues at step 344 where the DSN access module sends at least a write threshold number of temporary write requests to at least a write threshold number of DSN storage modules, wherein the write threshold number of temporary write requests includes at least a write threshold number of the set of encoded data slices. Each request includes one or more of a transaction number, one or more slice names, one or more associated slice revision numbers, one or more slice lengths, and one or more encoded data slices.

In response to one of the at least a write threshold number of temporary write requests, the method continues at step 346 where a DSN storage module of the at least a write threshold number of DSN storage modules temporarily stores an encoded data slice of the at least a write threshold number of the set of encoded data slices to produce a temporarily stored encoded data slice. The method continues at step 348 where the DSN storage module sends an indication of temporary storage of the encoded data slice to the DSN access module.

When a write threshold number of indications of temporary storage have not been received (e.g., within a time period), the method continues at step 350 where the DSN access module sends a plurality of rollback messages to the at least a write threshold number of DSN storage modules. In response to one of the plurality of rollback messages, the method continues at step 352 where the DSN storage module deletes the temporarily stored encoded data slice.

When a write threshold number of indications of temporary storage have been received, the method continues at step 354 where the DSN access module sends at least a write threshold number of permanent write requests to the at least a write threshold number of DSN storage modules. Each request includes the transaction number. In response to one of the at least a write threshold number of permanent write requests, the method continues at step 356 where the DSN storage module stores the temporarily stored encoded data slice in permanent memory. In addition, the DSN storage module may send a permanent write response to the DSN access module to indicate receipt of the permanent write request. The DSN access module may send additional permanent write requests to other DSN storage modules or send a undo request to facilitate deleting a latest encoded data slice revision and to facilitate making a previous encoded data slice revision visible again when a favorable number of permanent write responses have not been received by the DSN access module within the time period.

The method continues at step 358 where the DSN storage module sends an indication of permanent storage (e.g., a commit-made-durable response message) of the encoded data slice to the DSN access module (e.g., when the encoded data slice has been successfully stored in the permanent memory). When a write threshold number of indications of permanent storage have not been received (e.g., within a time period), the method continues at step 360 where DSN access module sends a plurality of undo messages to the at least a write threshold number of DSN storage modules. In response to one of the plurality of undo messages, the DSN storage module deletes the temporarily stored encoded data slice from the permanent memory.

When a write threshold number of indications of permanent storage have been received, the method continues at step 364 where the DSN access module deletes the set of temporarily stored encoded data slices. When a write threshold number of indications of permanent storage have been received, the method continues at step 366 where the DSN access module sends at least a write threshold number of finalize write requests to the at least a write threshold number of DSN storage modules. In response to one of the at least a write threshold number of finalize write requests, the method continues at step 368 where the DSN storage module deletes the temporarily stored encoded data slice. The method continues at step 370 where the DSN storage module determines whether a previous revision of the encoded data slices is stored in the permanent memory. When the previous revision of the encoded data slices is stored in the permanent memory, the method continues at step 372 where the DSN storage module updates an availability status to indicate that the previous revision of the encoded data slice is unavailable.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A computing device of a dispersed storage network (DSN) comprises:
    an interface;
    memory that stores:
        a directory that includes a file identifying field and an inumber field, wherein the directory stores a file identifier and a corresponding inumber for each of a plurality of files, wherein the plurality of files is stored in storage units of the DSN;
        inode tables corresponding to the storage units, wherein an inode table of the inode tables includes an inumber field, a meta data field, and a DSN address field and wherein the inode table stores an inumber, metadata, and a DSN address for each file stored in a corresponding storage unit of the storage units;
    a processing module operably coupled to the interface and the memory, wherein the processing module is operable to:
        monitor, for each of the inode tables, utilization of the memory to produce per inode table memory utilization data;
        monitor, for each of the storage units, utilization of memory of the storage units to produce per storage unit memory utilization data; and
        process, for at least one of the inode table and the corresponding storage unit, the per inode table memory utilization data and the per storage unit memory utilization data to adjust at least one of memory utilization of the inode table and memory utilization of the corresponding storage unit.

2. The computing device of claim 1, wherein the processing module is further operable to process the per inode table memory utilization data and the per storage unit memory utilization data by:
    detecting an imbalance between the per inode table memory utilization data and the per storage unit memory utilization data, wherein the imbalance indicates that the memory utilization for the inode table is being consumed at a greater rate than the memory utilization of the corresponding storage unit; and
    in response to the imbalance, adjusting the memory utilization for the inode table by transferring inode information for one or more files from the inode table to another inode table.

3. The computing device of claim 2, wherein the processing module is further operable to:
    in response to the imbalance, determine whether to use one other of the inode tables as the other inode table or to create a new inode table; and
    when the determination is to create a new inode table, allocate memory storage of the memory to the new inode table.

4. The computing device of claim 2, wherein the processing module is further operable to:
    in response to the imbalance, adjust the memory utilization of the corresponding storage unit by transferring the one or more files from the corresponding storage unit to another storage unit.

5. The computing device of claim 1, wherein the processing module is further operable to process the per inode table memory utilization data and the per storage unit memory utilization data by:
    detecting an imbalance between the per inode table memory utilization data and the per storage unit memory utilization data, wherein the imbalance indicates that the memory utilization for the inode table is being consumed at a greater rate than the memory utilization of the corresponding storage unit; and
    in response to the imbalance, adjusting the memory utilization for the inode table by:
        consolidating a set of inode table entries regarding a set of files into a single inode table entry, wherein the single inode table entry includes a new inumber and a new DSN address;
        updating the directory with the new inumber; and
        updating the corresponding storage unit with the new DSN address.

6. The computing device of claim 1, wherein the processing module is further operable to process the per inode table memory utilization data and the per storage unit memory utilization data by:
    detecting an imbalance between the per inode table memory utilization data and the per storage unit memory utilization data, wherein the imbalance indicates that the memory utilization for the corresponding storage unit is being consumed at a greater rate than the memory utilization of the inode table; and in response to the imbalance, adjusting the memory utilization for the corresponding storage unit by:
transferring inode information for one or more files from the inode table to another inode table; and
transferring the one or more files from the corresponding storage unit to another storage unit.

7. The computing device of claim 1, wherein the processing module is further operable to:
receive, via the interface, a data access request;
access the directory to identify one or more file identifiers corresponding to data of the data access request;
utilize one or more corresponding inumbers associated with the one or more file identifiers to identify one or more of the inode tables;
determining one or more DSN addresses from the one or more the inode tables based on the one or more corresponding inumbers; and
executing the data request utilizing the one or more DSN addresses.

8. A computer readable storage medium comprises:
a first memory that stores a directory that includes a file identifying field and an inumber field, wherein the directory stores a file identifier and a corresponding inumber for each of a plurality of files, wherein the plurality of files is stored in storage units of the DSN;
a second memory that stores inode tables corresponding to the storage units, wherein an inode table of the inode tables includes an inumber field, a meta data field, and a DSN address field and wherein the inode table stores an inumber, metadata, and a DSN address for each file stored in a corresponding storage unit of the storage units;
a third memory that stores operational instructions that, when executed by a computing device, causes the computing device to:
monitor, for each of the inode tables, utilization of the memory to produce per inode table memory utilization data;
monitor, for each of the storage units, utilization of memory of the storage units to produce per storage unit memory utilization data; and
process, for at least one of the inode table and the corresponding storage unit, the per inode table memory utilization data and the per storage unit memory utilization data to adjust at least one of memory utilization of the inode table and memory utilization of the corresponding storage unit.

9. The computer readable storage medium of claim 8, wherein the third memory further stores operational instructions that, when executed by the computing device, causes the computing device to process the per inode table memory utilization data and the per storage unit memory utilization data by:
detecting an imbalance between the per inode table memory utilization data and the per storage unit memory utilization data, wherein the imbalance indicates that the memory utilization for the inode table is being consumed at a greater rate than the memory utilization of the corresponding storage unit; and
in response to the imbalance, adjusting the memory utilization for the inode table by transferring inode information for one or more files from the inode table to another inode table.

10. The computer readable storage medium of claim 9, wherein the third memory further stores operational instructions that, when executed by the computing device, causes the computing device to:
in response to the imbalance, determine whether to use one other of the inode tables as the other inode table or to create a new inode table; and
when the determination is to create a new inode table, allocate memory storage of the memory to the new inode table.

11. The computer readable storage medium of claim 9, wherein the third memory further stores operational instructions that, when executed by the computing device, causes the computing device to:
in response to the imbalance, adjust the memory utilization of the corresponding storage unit by transferring the one or more files from the corresponding storage unit to another storage unit.

12. The computer readable storage medium of claim 8, wherein the third memory further stores operational instructions that, when executed by the computing device, causes the computing device to process the per inode table memory utilization data and the per storage unit memory utilization data by:
detecting an imbalance between the per inode table memory utilization data and the per storage unit memory utilization data, wherein the imbalance indicates that the memory utilization for the inode table is being consumed at a greater rate than the memory utilization of the corresponding storage unit; and
in response to the imbalance, adjusting the memory utilization for the inode table by:
consolidating a set of inode table entries regarding a set of files into a single inode table entry, wherein the single inode table entry includes a new inumber and a new DSN address;
updating the directory with the new inumber; and
updating the corresponding storage unit with the new DSN address.

13. The computer readable storage medium of claim 8, wherein the third memory further stores operational instructions that, when executed by the computing device, causes the computing device to process the per inode table memory utilization data and the per storage unit memory utilization data by:
detecting an imbalance between the per inode table memory utilization data and the per storage unit memory utilization data, wherein the imbalance indicates that the memory utilization for the corresponding storage unit is being consumed at a greater rate than the memory utilization of the inode table; and
in response to the imbalance, adjusting the memory utilization for the corresponding storage unit by:
transferring inode information for one or more files from the inode table to another inode table; and
transferring the one or more files from the corresponding storage unit to another storage unit.

14. The computer readable storage medium of claim 8, wherein the third memory further stores operational instructions that, when executed by the computing device, causes the computing device to:
receive, via the interface, a data access request;
access the directory to identify one or more file identifiers corresponding to data of the data access request;
utilize one or more corresponding inumbers associated with the one or more file identifiers to identify one or more of the inode tables;

determining one or more DSN addresses from the one or
  more the inode tables based on the one or more corresponding inumbers; and
executing the data request utilizing the one or more DSN
  addresses.

* * * * *